United States Patent
Seo et al.

(10) Patent No.: US 10,165,165 B2
(45) Date of Patent: Dec. 25, 2018

(54) ELECTRONIC DEVICE FOR IMAGE PHOTOGRAPHING

(71) Applicant: Samsung Electronics Co., Ltd., Gyeonggi-do (KR)

(72) Inventors: Jae-Il Seo, Gyeonggi-do (KR); Kijae Kim, Seoul (KR); Ji-Hoon Kim, Incheon (KR)

(73) Assignee: Samsung Electronics Co., Ltd (KR)

( * ) Notice: Subject to any disclaimer, the term of this patent is extended or adjusted under 35 U.S.C. 154(b) by 16 days.

(21) Appl. No.: 15/331,172

(22) Filed: Oct. 21, 2016

(65) Prior Publication Data
US 2017/0195533 A1 Jul. 6, 2017

(30) Foreign Application Priority Data
Jan. 5, 2016 (KR) ........................ 10-2016-0000985

(51) Int. Cl.
| | |
|---|---|
| *H04N 5/253* | (2006.01) |
| *H04N 7/18* | (2006.01) |
| *H04N 5/225* | (2006.01) |
| *G02B 13/06* | (2006.01) |
| *G03B 37/00* | (2006.01) |
| *H04N 5/232* | (2006.01) |
| *H04N 5/247* | (2006.01) |
| *G03B 17/02* | (2006.01) |
| *G03B 37/04* | (2006.01) |

(Continued)

(52) U.S. Cl.
CPC ........... *H04N 5/2254* (2013.01); *G02B 13/06* (2013.01); *G02B 19/008* (2013.01); *G03B 17/02* (2013.01); *G03B 37/00* (2013.01); *G03B 37/04* (2013.01); *H04N 5/2252* (2013.01); *H04N 5/2253* (2013.01); *H04N 5/2258* (2013.01); *H04N 5/23238* (2013.01); *H04N 5/247* (2013.01); *G02B 7/021* (2013.01)

(58) Field of Classification Search
CPC .... G02B 7/027; H04N 5/2252; H04N 5/2258; H04N 5/23238; G03B 37/00
See application file for complete search history.

(56) References Cited

U.S. PATENT DOCUMENTS

| | | | |
|---|---|---|---|
| 2010/0066851 A1* | 3/2010 | Pooley | H04N 5/2252 348/222.1 |
| 2011/0194009 A1* | 8/2011 | Park | H04N 5/2252 348/333.01 |

(Continued)

FOREIGN PATENT DOCUMENTS

| | | |
|---|---|---|
| KR | 20030091886 | 12/2003 |
| WO | WO2005/048586 | 5/2005 |

*Primary Examiner* — Sinh Tran
*Assistant Examiner* — Selam Gebriel
(74) *Attorney, Agent, or Firm* — The Farrell Law Firm, P.C.

(57) ABSTRACT

An electronic device is provided which includes a housing, a first camera module disposed on a first portion of the housing to face in a first direction, and having a first lens cover protruding in a convex shape from an outer surface of the housing, and a second camera module disposed on a second portion of the housing, which is positioned to be opposite to the first portion of the housing, to face in a second direction that is opposite to the first direction, and having a second lens cover protruding in a convex shape from an outer surface of the housing.

17 Claims, 31 Drawing Sheets

(51) Int. Cl.
*G02B 19/00* (2006.01)
*G02B 7/02* (2006.01)

(56) References Cited

U.S. PATENT DOCUMENTS

2013/0242040 A1* 9/2013 Masuda ............... H04N 5/2251
                                              348/36
2014/0267586 A1* 9/2014 Aguilar .............. H04N 5/23238
                                              348/36

* cited by examiner

ELECTRONIC DEVICE FOR IMAGE PHOTOGRAPHING

PRIORITY

This application claims priority under 35 U.S.C. § 119(a) to Korean Patent Application Serial No. 10-2016-0000985, which was filed in the Korean Intellectual Property Office on Jan. 5, 2016, the entire content of which is incorporated herein by reference.

BACKGROUND

1. Field of the Disclosure

The present disclosure generally relates to an electronic device that is able to perform 360-degree image photographing.

2. Description of the Related Art

An action camera is focused on usability, and is generally a camera device that performs 360-degree image photographing in order to photograph an image that may be watched on virtual reality (VR) equipment.

SUMMARY

According to an aspect of the present disclosure, an electronic device is provided that is able to perform 360-degree image photographing.

According to another aspect of the present disclosure, an electronic device is provided that is able to perform vertical 360-degree image photographing and horizontal 360-degree image photographing.

According to another aspect of the present disclosure, an electronic device is provided with a housing having a rotational directionality to minimize damage, such as a scratch, to a lens cover.

According to another aspect of the present disclosure, an electronic device is provided with a housing having a rotational directionality substantially about an optical axis.

According to another aspect of the present disclosure, an electronic device is provided that is able to photograph an image suitable for VR equipment.

According to another aspect of the present disclosure, an electronic device is provided that provides a thermal equilibrium/circulation member that minimizes a temperature deviation between first and second image sensors.

Accordingly, an aspect of the present disclosure provides an electronic device that includes a housing, a first camera module disposed on a first portion of the housing to face in a first direction, and having a first lens cover protruding in a convex shape from an outer surface of the housing, and a second camera module disposed on a second portion of the housing, which is positioned opposite to the first portion of the housing, to face in a second direction that is opposite to the first direction, and having a second lens cover protruding in a convex shape from an outer surface of the housing.

Another aspect of the present disclosure provides an electronic device that includes a housing, a first lens cover disposed on a first portion of the housing to face in a first direction, and protruding in a convex shape from an external face of the housing, a second lens cover disposed on a second portion of the housing, which is opposite to the first portion of the housing, to face in a second direction that is opposite to the first direction, and protruding in a convex shape from an external face of the housing, a first lens configured to face the first lens cover and having a first angle of view, and a second lens positioned to be opposite to the first lens, and configured to face the second lens cover, the second lens having a second angle of view. The housing may be configured in a shape that is disposed within first and second blind areas that do not interfere with first and second angles of view, respectively.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1A:
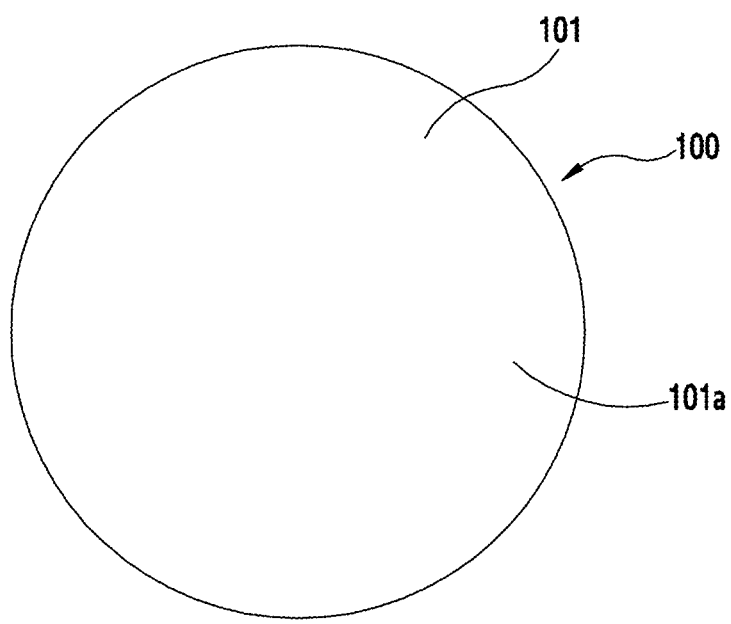
FIG. 1A is a perspective view illustrating an external appearance of a spherical electronic device according to an embodiment of the present disclosure.

Hereinafter, an embodiment of the present disclosure will be described with reference to the accompanying drawings. However, it should be understood that there is limiting the present disclosure to the particular forms disclosed herein, rather, the present disclosure should be construed to cover various modifications, equivalents, and/or alternatives of embodiments of the present disclosure. In describing the drawings, similar reference numerals may be used to designate similar constituent elements.

As used herein, the expressions "have", "may have", "include", or "may include" refer to the existence of a corresponding feature (e.g., numeral, function, operation, or constituent element such as component), and do not exclude one or more additional features.

In the present disclosure, the expressions "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expressions "first", "second", and the like as used in an embodiment of the present disclosure may modify various elements regardless of order or importance, and do not limit corresponding elements. The above-described expressions may be used to distinguish an element from another element. For example, a first user device and a second user device indicate different user devices although both of them are user devices. For example, a first element may be referred to as a second element, and similarly, a second element may be referred to as a first element without departing from the scope of the present disclosure.

It should be understood that when an element (e.g., first element) is referred to as being (operatively or communicatively) "connected," or "coupled," to another element (e.g., second element), it may be directly connected or coupled to the other element or any other element (e.g., third element) may be interposed between them. In contrast, it may be understood that when an element (e.g., first element) is referred to as being "directly connected," or "directly coupled" to another element (second element), there are no elements (e.g., third element) interposed between them.

The expression "configured to" as used in the present disclosure may be used interchangeably with, for example, "suitable for", "having the capacity to", "designed to", "adapted to", "made to", or "capable of" according to the situation. The expression "configured to" may not necessarily mean "specially designed to" in terms of hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a general-purpose processor (e.g., central processing unit (CPU) or application processor (AP)) that may perform the corresponding operations by executing one or more software programs stored in a memory device.

The terms used herein are merely for the purpose of describing particular embodiments and do not limit the scope of other embodiments. As used herein, singular forms may include plural forms as well unless the context clearly indicates otherwise. Unless defined otherwise, all terms used herein, including technical terms and scientific terms, may have the same meaning as commonly understood by a person of ordinary skill in the art to which the present disclosure pertains. Terms, such as those defined in commonly used dictionaries, should be interpreted as having meanings that are the same or similar to their meaning in the context of the relevant art and will not be interpreted in an idealized or overly formal sense unless expressly so defined herein. In some cases, even terms defined in the present disclosure should not be interpreted to exclude embodiments of the present disclosure.

FIG. 1A is a perspective view illustrating an external appearance of a spherical electronic device according to an embodiment of the present disclosure.

Referring to FIG. 1A, an electronic device 100 may include an approximately or completely spherical housing 101. The housing 101 has a diameter, and includes an outer peripheral surface 101a having a diameter. Various functional components may be arranged on the exterior of the housing 101. The functional components may include, for example, a lens cover, a microphone, a speaker, a display unit, a button, and a lamp.

However, when the spherical housing 101 exists on a bottom, the housing 101 may have a configuration that cannot rotate to have a predetermined direction. Because the spherical housing 101 rolls in a random direction on the bottom without a predetermined direction, the functional components arranged on the exterior of the spherical housing 101 may be damaged. For example, the functional components arranged on the exterior may be scratched.

Figure 1B:
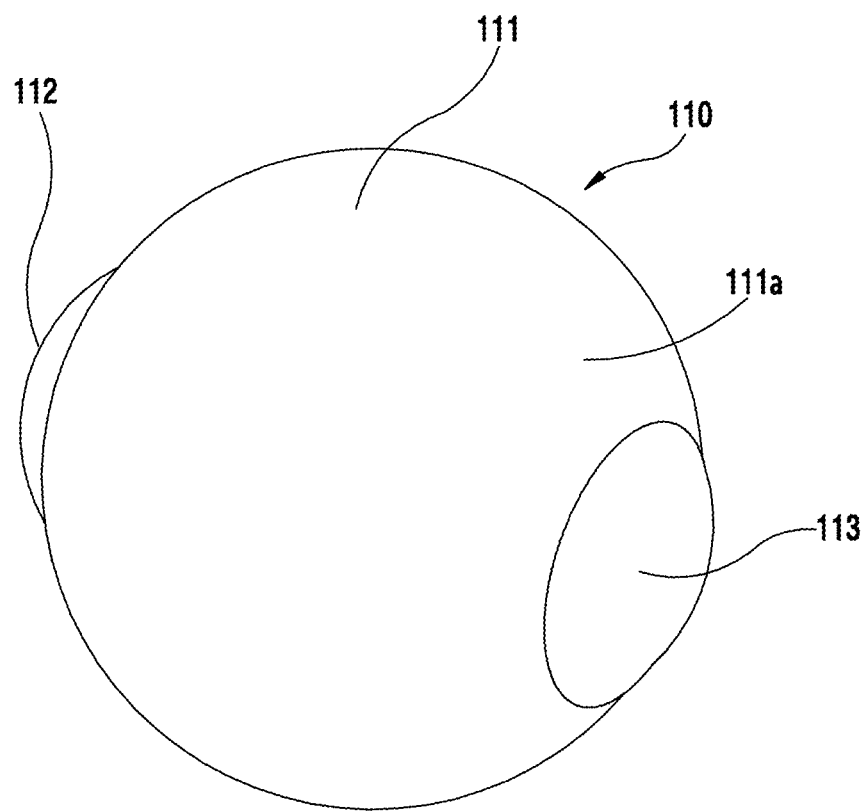
FIG. 1B is a perspective view illustrating an external appearance of an electronic device according to another embodiment of the present disclosure.
Figure 1C:
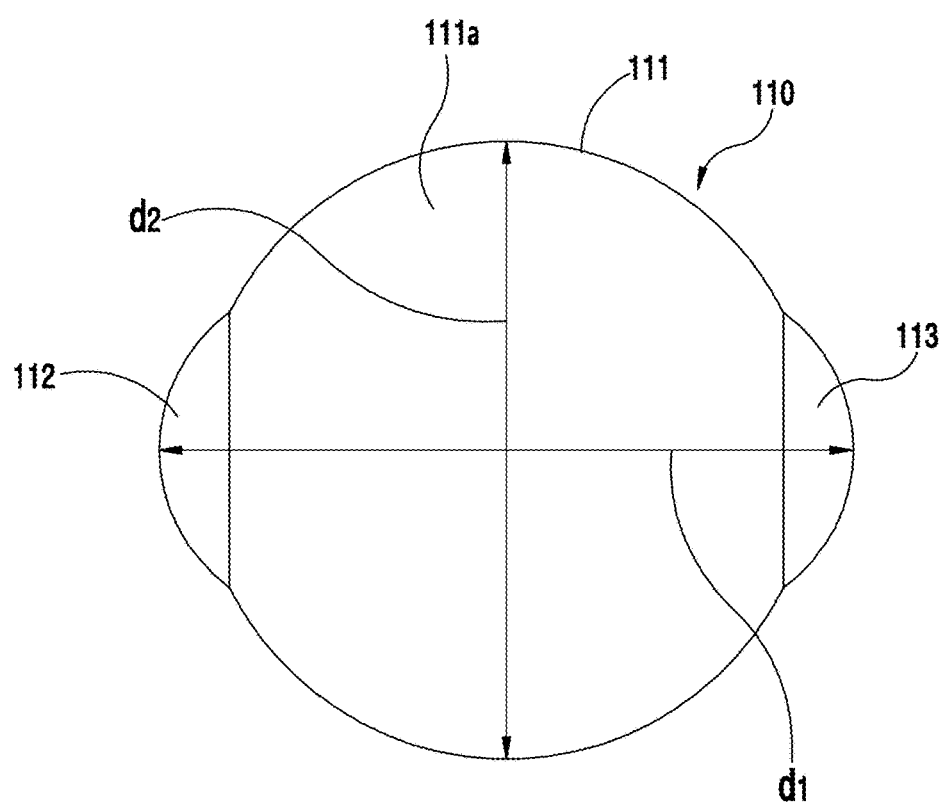
FIG. 1C is a front view illustrating an external appearance of an electronic device according to another embodiment of the present disclosure.

FIG. 1B is a perspective view illustrating an external appearance of an electronic device according to an embodiment of the present disclosure. FIG. 1C is a front view illustrating an external appearance of an electronic device according to an embodiment of the present disclosure.

Referring to FIGS. 1B and 1C, the electronic device 110 includes an approximately spherical housing 111. the electronic device 110 includes a housing 111 and a pair of exterior members 112 and 113. The exterior members 112 and 113 are members exposed to the outer surface 111a of the electronic device, and may include, for example, a lens cover, a window, and so on. Hereinafter, the exterior members 112 and 113 will be referred to as lens covers. The lens covers 112 and 113 protect an internal camera module from an external shock, and may include a material that allows the internal camera module to photograph the outside. The material may include a transparent material.

According to an embodiment of the present disclosure, the housing 111 may have a diameter, and may include an outer surface having a diameter. Various functional components may be arranged on the exterior of the housing 111. The functional components may include, for example, a microphone, a speaker, and a display unit.

According to an embodiment of the present disclosure, the housing 111 includes a pair of lens covers 112 and 113 that are opposite to each other. The lens covers include a first lens cover 112 disposed on a first portion of the housing 111, and a second lens cover 113 disposed to be symmetric to the first lens cover 112 on a second portion of the housing 111 that is opposite to the first portion. Each of the first and second lens covers 112 and 113 may protrude to be convex from the outer surface of the housing 111.

According to an embodiment of the present disclosure, the outer surface of the housing 111 has a first curvature, each of the first and second lens covers 112 and 113 has a second curvature, and the first curvature may be larger than the second curvature. The housing 111 includes a major axis d1 and a minor axis d2, in which the diameter of the housing 111 may correspond to the minor axis d2 and an optical axis, which passes through the centers of the first and second lens covers 112 and 113, may correspond to the major axis d1.

When the electronic device 110 is rotated on a table, the housing 111 according to an embodiment of the present disclosure may rotate substantially using the major axis d1 as a rotational center. For example, when the housing 111 rolls on a ground, it is possible to minimize the abutment of the first and second lens covers 112 and 113 on the ground. That is, the occurrence of scratches on the first and second lens covers 112 and 113 may be minimized.

Figure 2A:
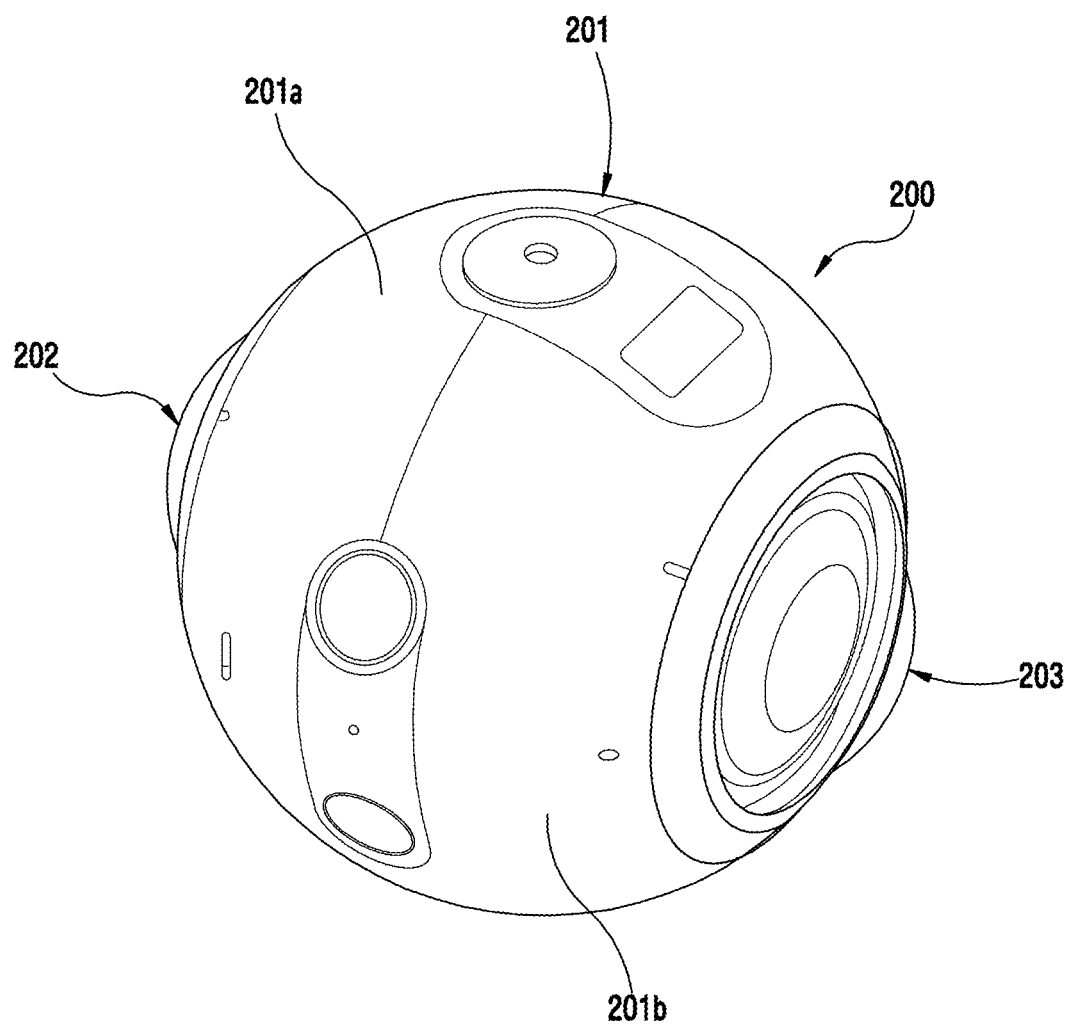
FIG. 2A is a perspective view illustrating a configuration of an electronic device according to an embodiment of the present disclosure.
Figure 2B:
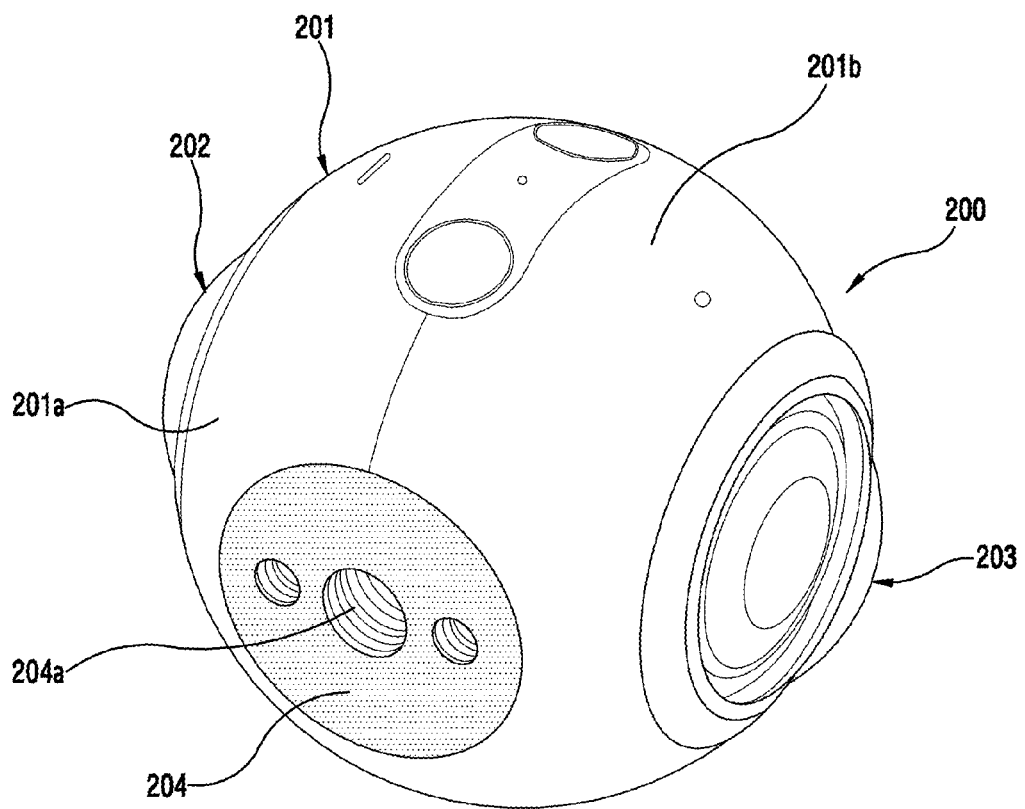
FIG. 2B is a perspective view illustrating a configuration of an electronic device in a rotated state according to an embodiment of the present disclosure.
Figure 2C:
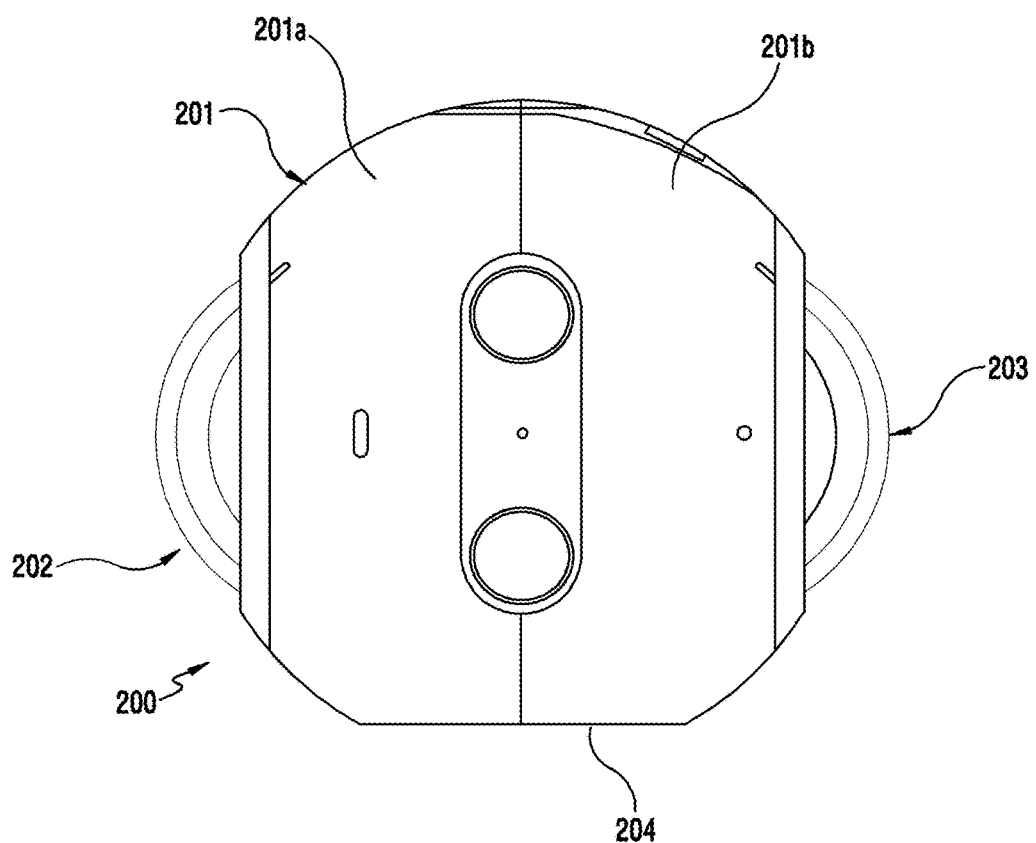
FIG. 2C is a side view illustrating a configuration of an electronic device according to an embodiment of the present disclosure.

FIG. 2A is a perspective view illustrating a configuration of an electronic device according to an embodiment of the present disclosure. FIG. 2B is a perspective view illustrating a configuration of the electronic device according to an embodiment of the present disclosure in a rotated state. FIG. 2C is a side view illustrating a configuration of the electronic device according to an embodiment of the present disclosure.

Referring to FIGS. 2A to 2C, the electronic device 200 may be the same as the electronic device 101 illustrated in FIGS. 1B and 1C. The electronic device 200 includes an approximately spherical housing 201. The electronic device 200 includes a housing 201 and first and second camera modules 202 and 203. For example, each of the first and second camera modules 202 and 203 may include a lens cover at the outermost area thereof.

According to an embodiment of the present disclosure, the housing 201 may have a diameter, and may include an outer peripheral surface having a diameter. Various functional components may be arranged on the exterior of the housing 201. The functional components may include, for example, a microphone, a speaker, a display unit, a button, and a lamp.

According to an embodiment of the present disclosure, the housing 201 includes first and second camera modules 202 and 203 that are opposite to each other. The electronic device 200 includes a first camera module 202 that is disposed on a first portion of the housing 201 and faces in a first direction, and a second camera module 203 that is disposed to be symmetric to the first camera module 202 on a second portion of the housing 201 that is opposite to the first portion, and faces in a second direction that is opposite to the first direction. Each of the first and second camera modules 202 and 203 may protrude to be convex from the outer peripheral surface of the housing. The first and second camera modules 202 and 203 may have central points on the same axis and may be disposed to be symmetric to each other. The first and second camera modules 202 and 203 may have the same configuration.

According to an embodiment of the present disclosure, the outer peripheral surface of the housing has a first curvature, each of the first and second camera modules 202 and 203 has a second curvature, and the first curvature may be larger than the second curvature.

According to an embodiment of the present disclosure, the housing includes a front housing 201a and a rear housing 201b. The front housing 201a and the rear housing 201b may be equipped with the first camera module 202 and the second camera module 203, respectively.

When the electronic device is rotated on a table, the electronic device 200 may rotate substantially using the optical axis passing through the centers of the first and second camera modules 202 and 203, as the rotational center. For example, when the housing 201 rolls on a ground, it is possible to minimize the abutment of the first and second camera modules 202 and 203 on the ground. That is, the occurrence of scratches on the first and second camera modules 202 and 203 may be minimized.

According to an embodiment of the present disclosure, the electronic device 200 includes a flat portion 204 that is formed by removing a portion below the optical axis from the configuration of the spherical housing 201. The flat portion 204 may be a mounting part that may serve to stop the housing 201 and may be coupled to a counterpart object. Hereinafter, the flat portion will be referred to as a mounting part. The counterpart object may be, for example, a camera accessory (e.g., a tripod, a selfie stick, an external battery, or various coupling mounts), an action camera, a portable electronic device, or an unmanned aerial vehicle (e.g., a drone). The mounting part 204 may be provided with at least one fastening hole 204a to which a fastener is fastened.

According to an embodiment of the present disclosure, only the first and second lens covers of the first and second camera modules 202 and 203 may be exposed to the exterior of the electronic device 200.

Figure 3A:
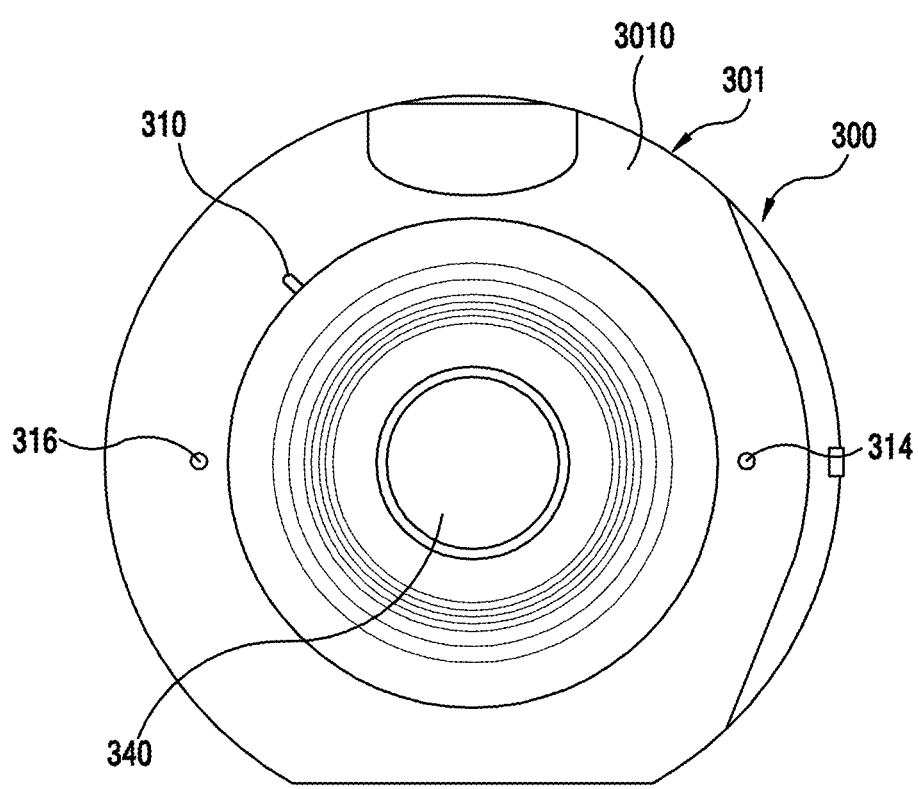
FIG. 3A is a front view illustrating a configuration of an electronic device according to an embodiment of the present disclosure.
Figure 3B:
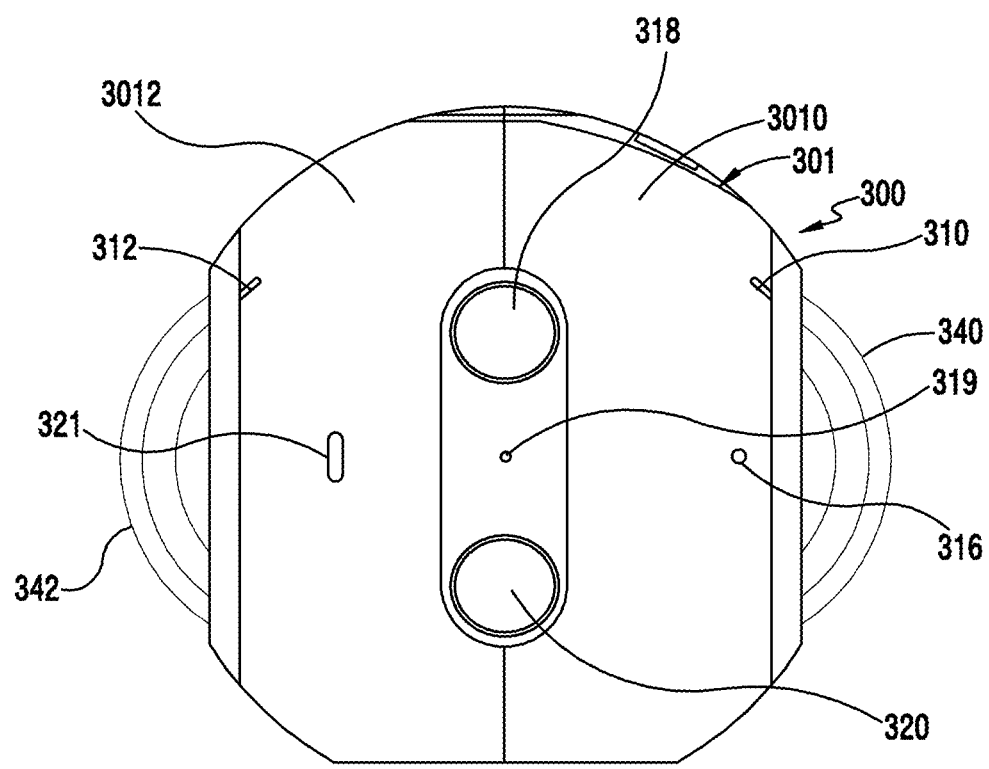
FIG. 3B is a left side view illustrating a configuration of an electronic device in a rotated state according to an embodiment of the present disclosure.
Figure 3C:
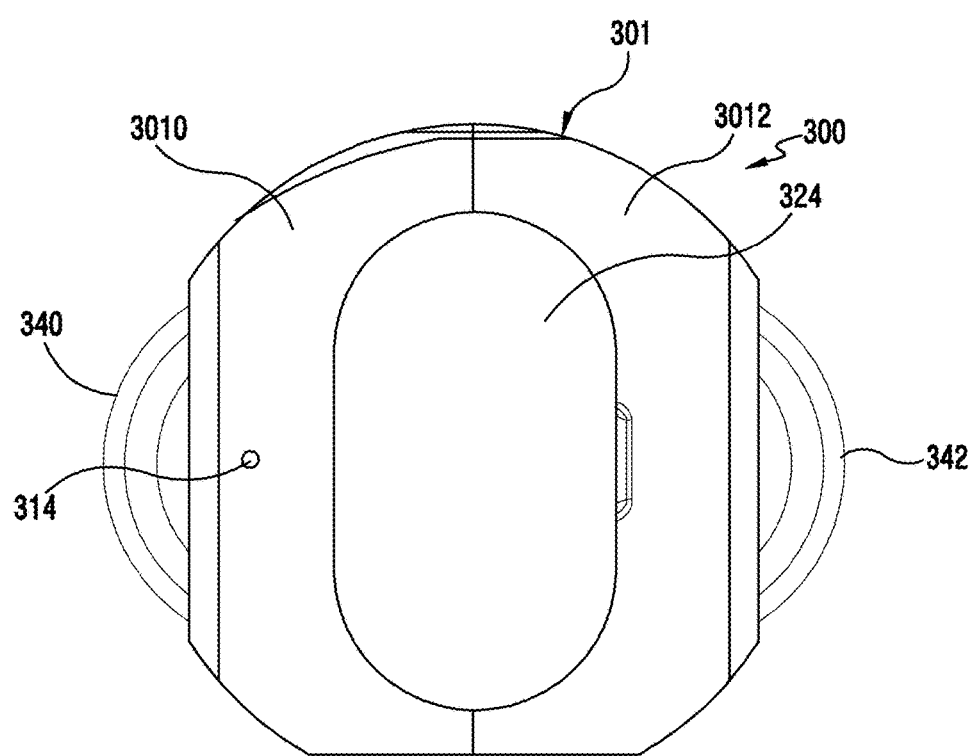
FIG. 3C is a right side view illustrating a configuration of an electronic device according to an embodiment of the present disclosure.
Figure 3D:
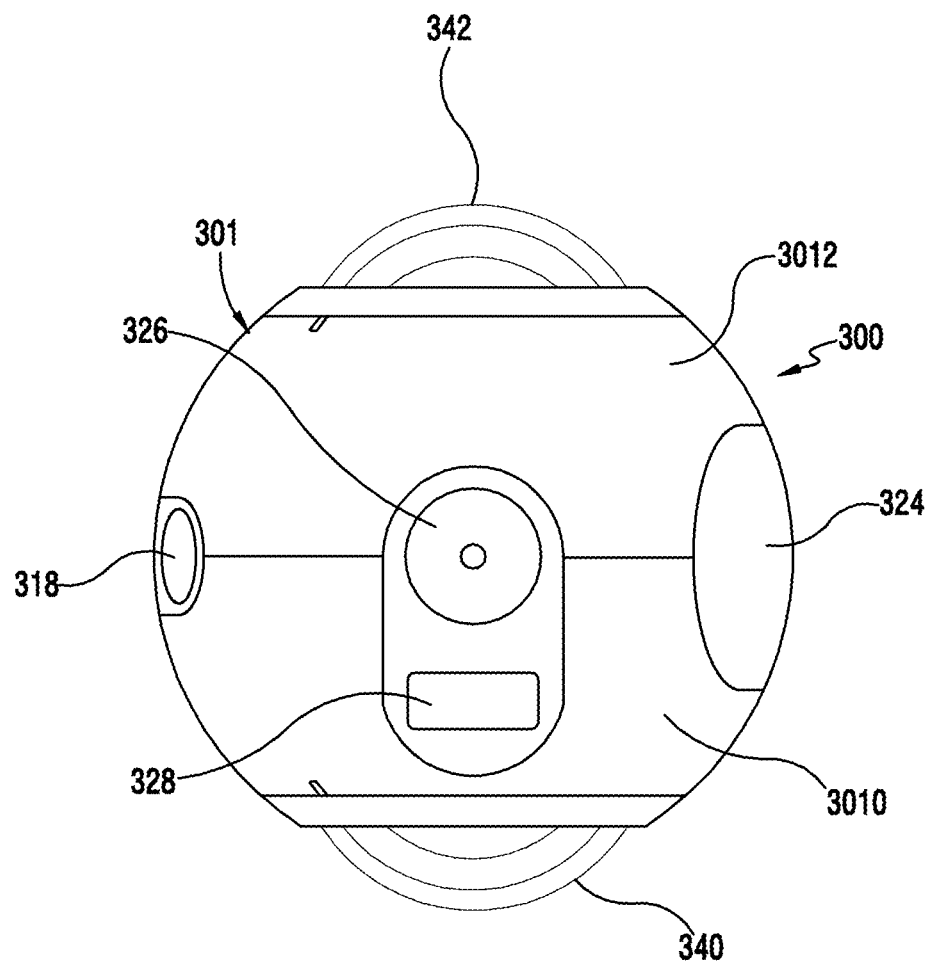
FIG. 3D is a plan view illustrating a configuration of an electronic device according to an embodiment of the present disclosure.
Figure 3E:
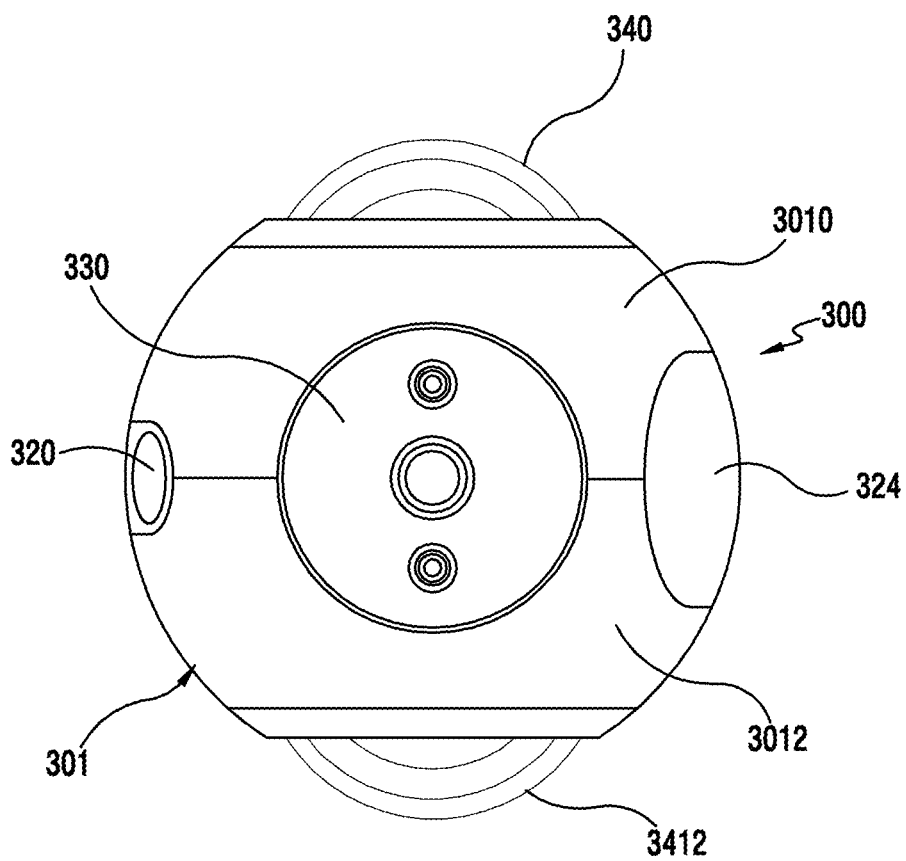
FIG. 3E is a bottom view illustrating a configuration of an electronic device in a rotated state according to an embodiment of the present disclosure.
Figure 3F:
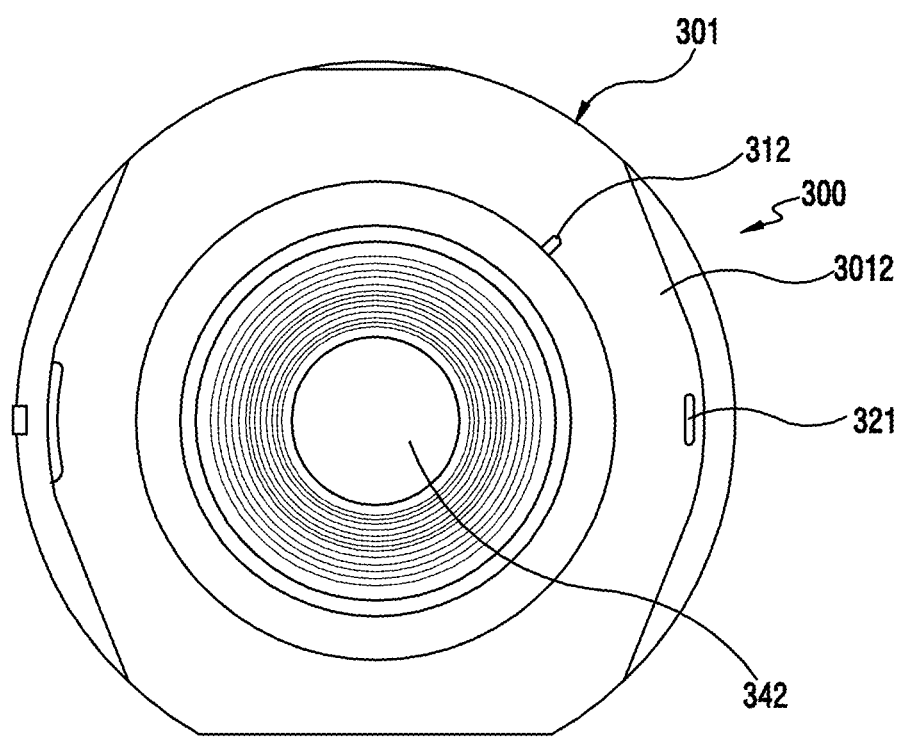
FIG. 3F is a rear view illustrating a configuration of an electronic device according to an embodiment of the present disclosure.

FIG. 3A is a front view illustrating a configuration of an electronic device according to an embodiment of the present disclosure. FIG. 3B is a left side view illustrating a configuration of the electronic device in a rotated state according to an embodiment of the present disclosure. FIG. 3C is a right side view illustrating a configuration of the electronic device according to an embodiment of the present disclosure. FIG. 3D is a plan view illustrating a configuration of the electronic device according to an embodiment of the present disclosure. FIG. 3E is a front view illustrating a configuration of the electronic device in a rotated state according to an embodiment of the present disclosure. FIG. 3F is a rear view illustrating a configuration of the electronic device according to an embodiment of the present disclosure.

Referring to FIGS. 3A to 3F, the electronic device 300 may be the same as the electronic device 200 illustrated in FIGS. 2A to 2C.

The electronic device 300 includes a housing 301. The housing 301 may be referred to as a case, a cover, or a body. The housing 301 includes a front housing 3010 and a rear housing 3012. A first camera module 340 may be disposed in the front housing 3010, and a second camera module 342 may be disposed in the rear housing 3012.

According to an embodiment of the present disclosure, the front housing 3010 includes a first camera module ON/OFF lamp 310 disposed along the periphery of the first camera module 340. For example, the first camera module ON/OFF lamp 310 may include an LED mounted on a main printed circuit board. In addition, the front housing 3010 includes first and second microphone holes 314 and 316 disposed along the periphery of the first camera module 340.

According to an embodiment of the present disclosure, the rear housing 3012 includes a second camera module ON/OFF lamp 312 disposed along the periphery of the second camera module 342. For example, the second camera module ON/OFF lamp 312 may include an LED mounted on the main printed circuit board. In addition, the rear housing 3012 includes a speaker hole 321 disposed along the periphery of the second camera module 342.

According to an embodiment of the present disclosure, the housing 301 includes a power button/mode change button 318, a setting button 320, and a status indicating lamp 319 on one lateral side portion between the first and second camera modules 340 and 342. The status indicating lamp 319 may include an LED mounted on a board.

According to an embodiment of the present disclosure, the housing 301 includes a battery cover 324 on the other lateral side portion between the first and second camera modules 340 and 342. The housing 301 includes a shutter button 326 and a display 328 on the upper side portion between the first and second camera modules 340 and 342. The housing 301 includes a mounting part 330 on the lower side portion between the first and second camera modules 340 and 342. The mounting part 330 may include a fastening hole. The display 328 may be formed to be flat or curved.

Figure 4A:
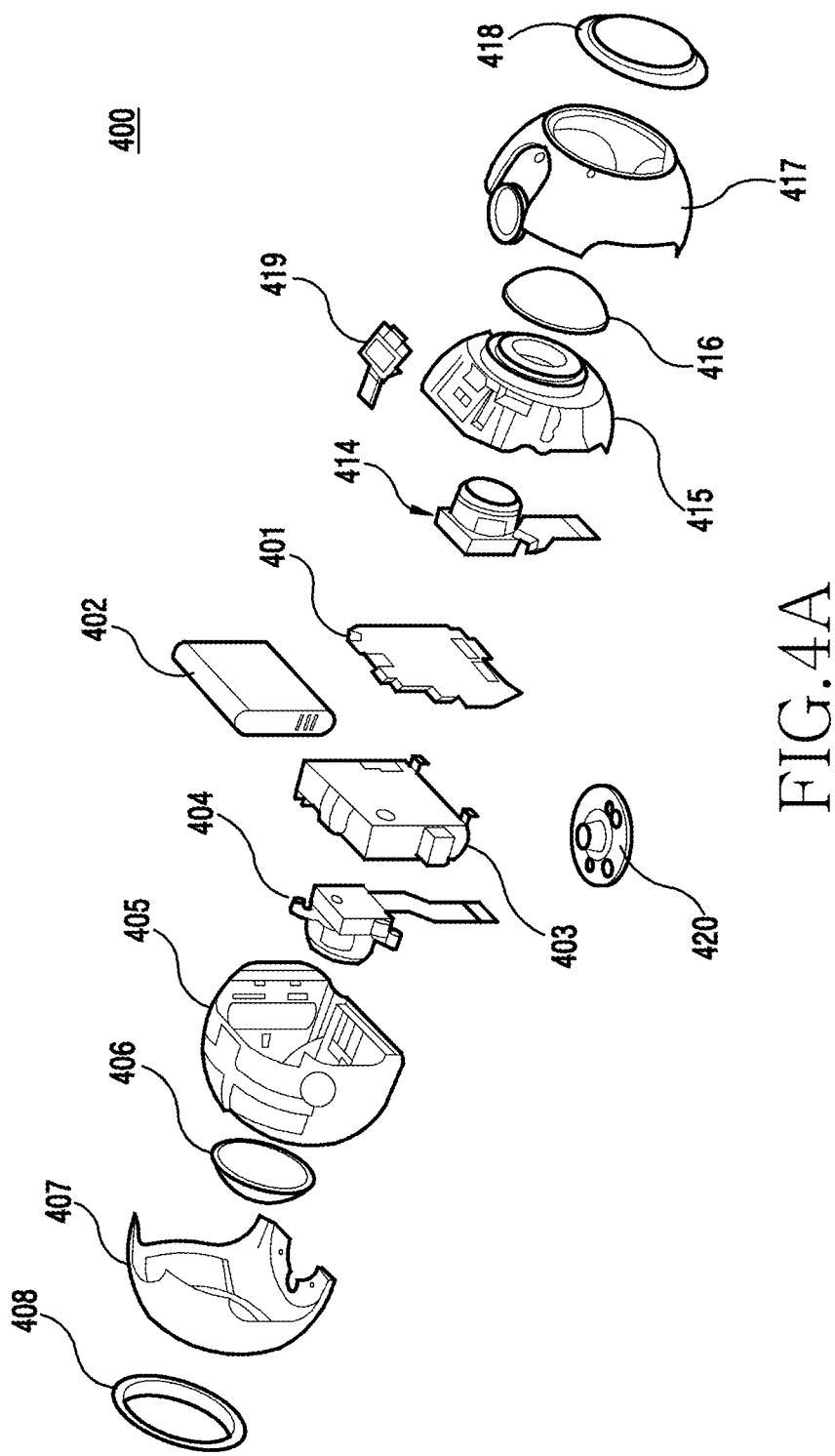
FIG. 4A is an exploded perspective view illustrating an internal configuration of an electronic device according to an embodiment of the present disclosure.
Figure 4B:
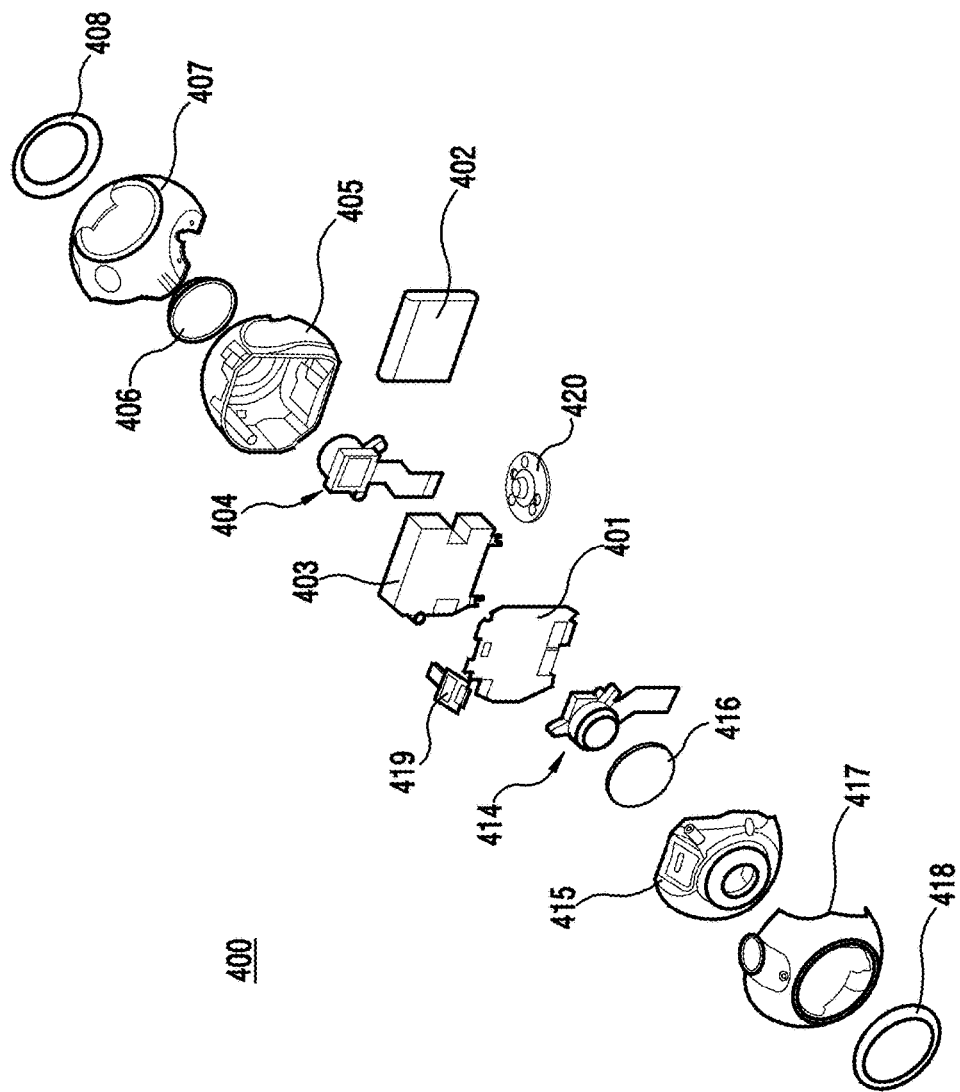
FIG. 4B is an exploded perspective view illustrating an internal configuration of an electronic device according to another embodiment of the present disclosure.

FIGS. 4A and 4B are exploded perspective views each illustrating an internal configuration of an electronic device according to an embodiment of the present disclosure.

Referring to FIGS. 4A and 4B, the electronic device 400 according to an embodiment of the present disclosure may be the same as the electronic device 300 illustrated in FIGS. 3A to 3F. The electronic device 400 includes a main printed circuit board 401, a battery 402, first and second inner supports 405 and 415, first and second camera modules 404 and 414, and front and rear housings 407 and 417.

According to an embodiment of the present disclosure, the main printed circuit board 401 (hereinafter, referred to as a board) may include a first face that faces in a first direction, and a second face that faces in a second direction. The first direction may be the front side, and the second direction may be the rear side. The electronic device 400 includes, in the first direction of the board 401, the first camera module 404, the front housing 407, the first inner support 405, and a battery support 403 into which the battery 402 is inserted. The first inner support 405 may be, for example, a front inner bracket, and may support the first camera module 404, the battery support 403, and the board 401. Reference numeral 406 may denote a first lens cover. Reference numeral 408 may denote a first lens decoration member. Female threads may be formed inside the first lens decoration member 408, and a male-threaded member may be assembled to the first inner support 405 so as to fasten the female and male threads to each other, thereby fastening the first lens decoration member 408 to the first inner support 405. By the female and male thread fastening structure, it is possible to prevent the front housing 407 and the first lens cover 406 from breaking away. The functional components listed above may be assembled along an optical axis.

According to an embodiment of the present disclosure, the electronic device 400 includes, in the second direction of the board 401, the second camera module 414, the rear housing 417, and the second inner support 415. The second inner support 415 may be, for example, a rear inner bracket, and may support the second camera module 414 and the display 419. Reference numeral 416 may denote a second lens cover. Reference numeral 418 may denote a second lens decoration member. Female threads may be formed inside the second lens decoration member 418, and a male-threaded member may be assembled to the second inner support 415 so as to fasten the female and male threads to each other, thereby fastening the second lens decoration member 418 to the second inner support 415. By the female and male thread fastening structure, it is possible to prevent the rear housing 417 and the second lens cover 416 from breaking away. The functional components listed above may be assembled along the optical axis.

In the electronic device 400 according to an embodiment of the present disclosure, the mounting part 420 may be coupled in the third direction of the board 401. In the electronic device 400, the display 419 may be coupled in the fourth direction of the board 401.

Figure 5:
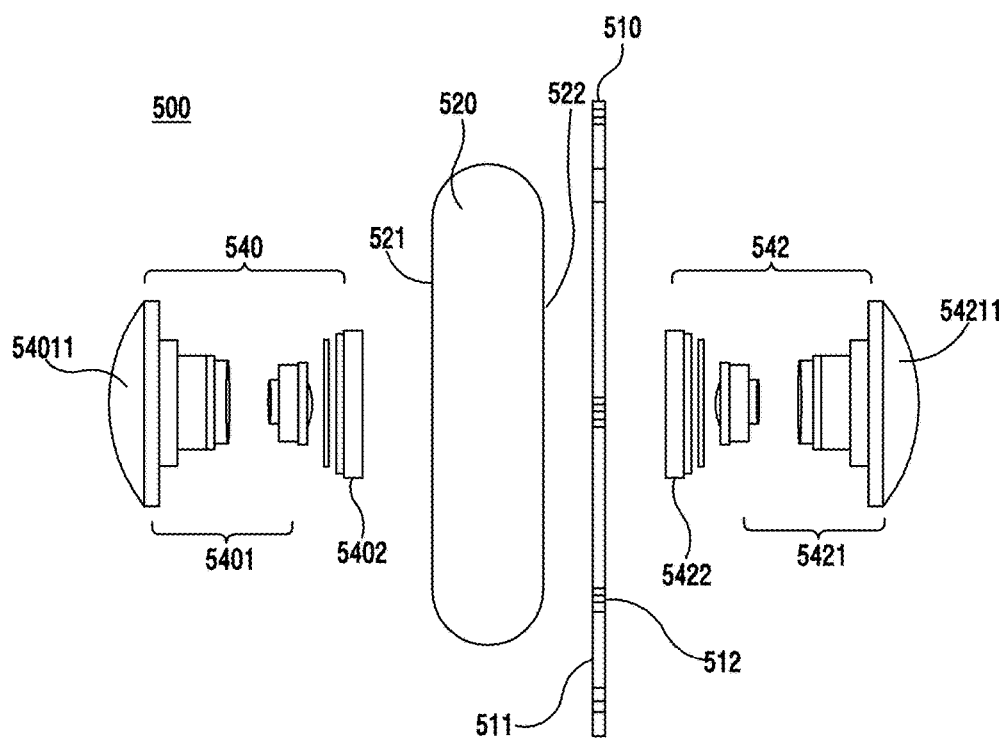
FIG. 5 is a view illustrating an arrangement of internal components of an electronic device according to an embodiment of the present disclosure.

FIG. 5 is a view illustrating an arrangement of internal components of an electronic device according to an embodiment of the present disclosure.

Referring to FIG. 5, the electronic device 500 may be the same as the electronic device 400 illustrated in FIGS. 4A and 4B. A battery 520 and a board 510 may be disposed between first and second camera modules 540 and 542. The battery 520 may be disposed in such a manner in which a first face 521 faces the first camera module 540 and a second face 522, which is opposite to the first face 521, faces the board 510. In addition, the board 510 may be disposed in such a manner in which a first face 511 faces the second face 522 of the battery and a second face 512, which is opposite to the first face 511, faces the second camera module 542.

According to an embodiment of the present disclosure, each of the battery 520 and the board 510 may be disposed to be upright in the direction that is orthogonal to the optical axis. The first camera module 540 includes a first lens system 5401 and a first image sensor 5402 that faces the first lens system 5401. The first lens system 5401 may include one or more lenses. For example, the first lens system 5401 includes a first fish-eye lens 54011. The first fish-eye lens 54011 may be disposed at the outermost area of the first lens system 5401.

According to an embodiment of the present disclosure, the second camera module 542 includes a second lens system 5421 and a second image sensor 5422 that faces the second lens system 5421. The first image sensor 5402 may face the battery 520, and the second image sensor 5422 may face the board 510. The second lens system 5421 may include one or more lenses. For example, the second lens system 5421 includes a second fish-eye lens 54211. The second fish-eye lens 54211 may be disposed at the outermost area of the second lens system 542.

In the electronic device 500, the battery 520 may be disposed to be centered on the optical axis and to be upright in the direction orthogonal to the optical axis substantially at the center of the optical axis, thereby acting as a portion of the center of gravity of the housing. That is, because the battery 520 is the heaviest among the inner components mounted in the electronic device 500, the battery may help determine the direction of rotation of the housing.

Figure 6:
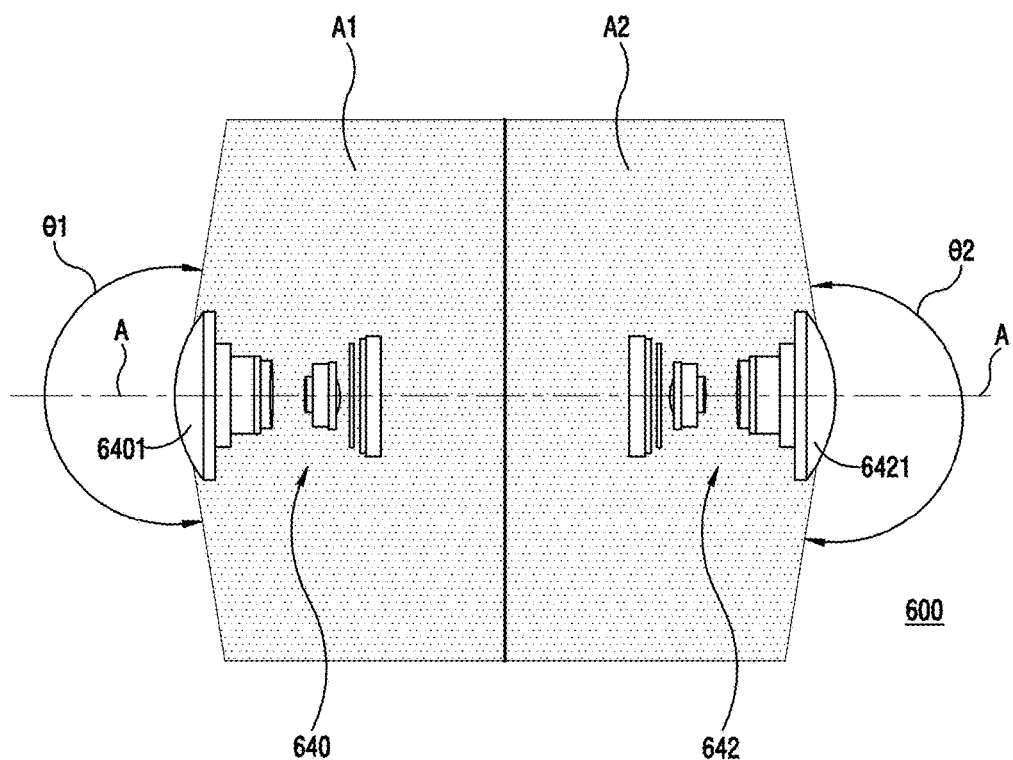
FIG. 6 is a view illustrating blind areas of first and second camera modules of an electronic device according to an embodiment of the present disclosure.

FIG. 6 is a view illustrating blind areas A1 and A2 of first and second camera modules 640 and 642 of an electronic device 600 according to an embodiment of the present disclosure. The electronic device 600 may be the same as the electronic device 400 illustrated in FIGS. 4A and 4B.

Referring to FIG. 6, in the housing of the electronic device 600, the first and second camera modules 640 and 642 are arranged along the optical axis A to be symmetric to each other, as described above. The first camera module 640 includes a first fish-eye lens 6401 at the outermost area thereof, and the second camera module 642 includes a second fish-eye lens 6421 at the outermost area thereof. According to an embodiment, the first fish-eye lens 6401 may have a first angle of view Θ1, which is 180 degrees or more. The second fish-eye lens 6421 may have a second angle of view Θ2, which is 180 degrees or more. Accordingly, the electronic device 600 is able to perform 360-degree photographing, and to perform vertical 360-degree photographing and horizontal 360-degree photographing (photographing performed while rotating 360 degrees about the horizontal direction and photographing performed while rotating 360 degrees about the vertical direction).

According to an embodiment of the present disclosure, the electronic device 600 may be configured in a shape in which the first and second camera modules 640 and 642 are respectively arranged within a first blind area A1 and a second blind area A2, which do not interfere with the first angle of view and the second angle of view, respectively. For example, the housing of the electronic device 600 may be formed in various shapes, such as a spherical shape, a rugby ball-like shape, and a polygonal columnar shape, within the first and second blind areas A1 and A2. An angle of view refers to an angle that may be photographed by each of the first and second camera modules 640 and 642, an angle of non-view refers to an angle that cannot be photographed by each of the first and second camera modules 640 and 642, and a blind area refers to an area that cannot be photographed by each of the first and second cameras 640 and 642.

Figure 7A:
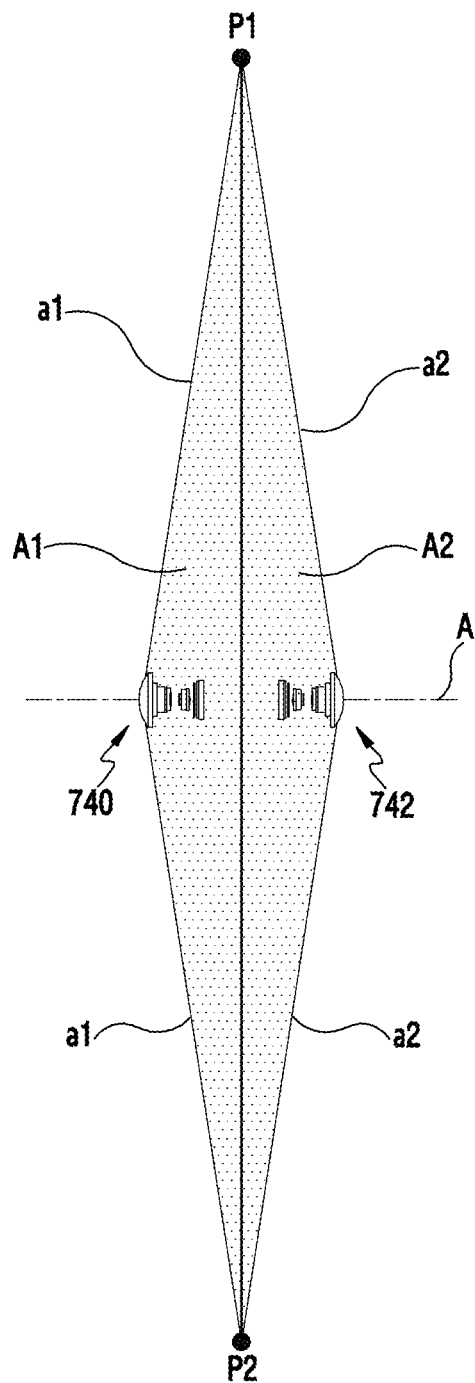
FIG. 7A is a view illustrating the entire blind area of first and second camera modules of an electronic device according to an embodiment of the present disclosure.

FIG. 7A is a view illustrating the entire first and second blind areas A1 and A2 of the first and second camera modules 740 and 742 according to an embodiment of the present disclosure. The first blind area A1 may have a first equilateral triangle shape, and the second blind area A2 may have a second equilateral triangle shape. The first and second equilateral triangle shapes may be equal to each other and may be arranged to be symmetric to each other. The lines of the first angle of view a1 of the first camera module and the lines of the second angle of view a2 of the second camera module may intersect at points P1 and P2.

Figure 7B:
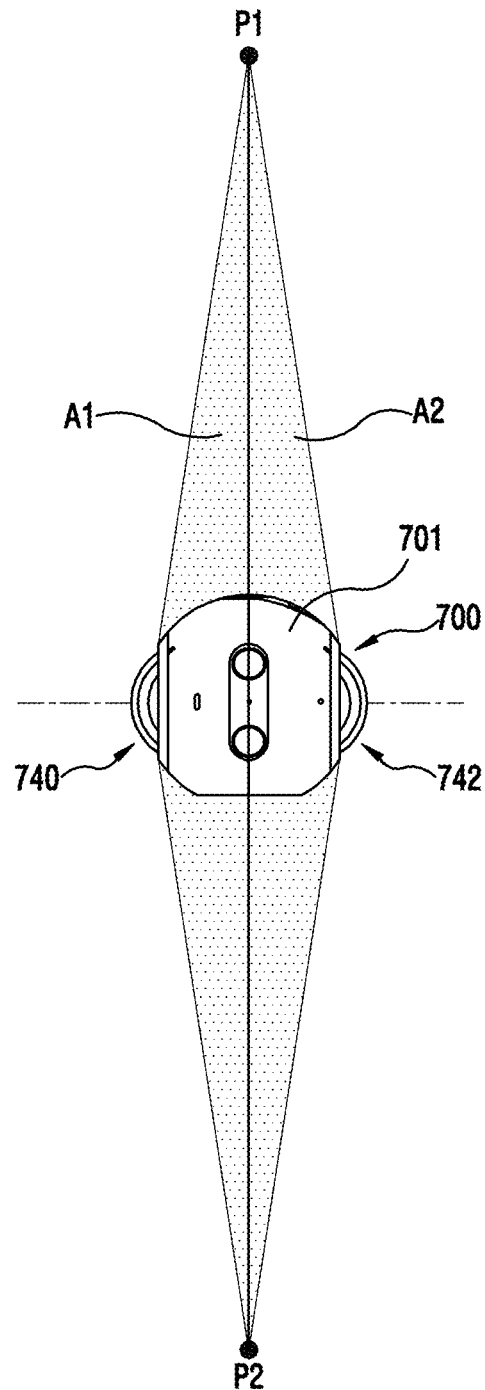
FIG. 7B is a view illustrating the entire blind area of an electronic device according to another embodiment of the present disclosure.

FIG. 7B is a view illustrating a housing 701 of an electronic device 700, which is disposed within the first and second blind areas A1 and A2 according to an embodiment of the present disclosure. The first blind area A1 may have a first equilateral triangle shape, and the second blind area A2 may have a second equilateral triangle shape. The first and second equilateral triangle shapes may be equal to each other and may be arranged to be symmetric to each other. The lines of the first angle of view a1 of the first camera module 740 and the lines of the second angle of view a2 of the second camera module 742 may intersect at points P1 and P2.

Figure 8A:
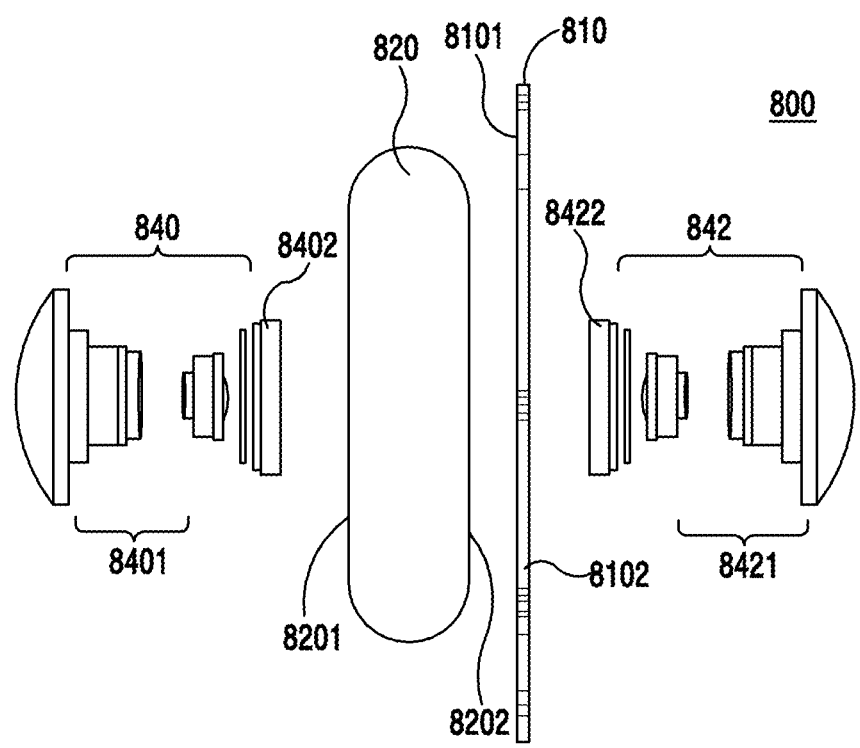
FIG. 8A is a view illustrating an arrangement of internal components of an electronic device according to an embodiment of the present disclosure.

FIG. 8A is a view illustrating an arrangement of internal components of an electronic device 800 according to an embodiment of the present disclosure.

Referring to FIG. 8A, the electronic device 800 may be the same as the electronic device 400 illustrated in FIGS. 4A and 4B. The electronic device 800 includes first and second camera modules 840 and 842, a battery 820, and a board 810. The first camera module 840 includes a first lens system 8401 and a first image sensor 8402 that faces the first lens system 8401, and the second camera module 842 includes a second lens system 8421 and a second image sensor 8422 that faces the second lens system 8421.

According to an embodiment of the present disclosure, the battery 820 may be interposed between the first image sensor 8402 and the first face 8101 of the board 810. The board 810 may be interposed between the second face 8202 of the battery and the second image sensor 8422.

Figure 8B:
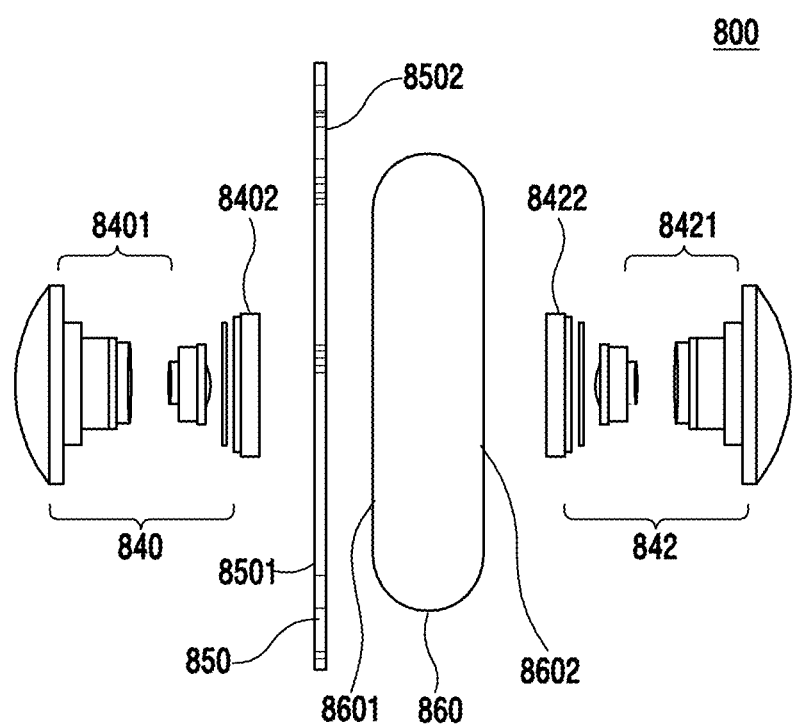
FIG. 8B is a view illustrating another arrangement of internal components of an electronic device according to an embodiment of the present disclosure.

FIG. 8B is a view illustrating another arrangement of internal components of the electronic device 800 according to an embodiment of the present disclosure.

Referring to FIG. 8B, the electronic device 800 includes first and second camera modules 840 and 842, a battery 860, and a board 850. The first camera module 840 includes a first lens system 8401 and a first image sensor 8402 that faces the first lens system 8401, and the second camera module 842 includes a second lens system 8421 and a second image sensor 8422 that faces the second lens system 8421.

According to an embodiment of the present disclosure, the battery 860 may be interposed between the second image sensor 8422 and the second face 8502 of the board 810. The board 850 may be interposed between the first face 8601 of the battery and the first image sensor 8402.

Figure 9A:
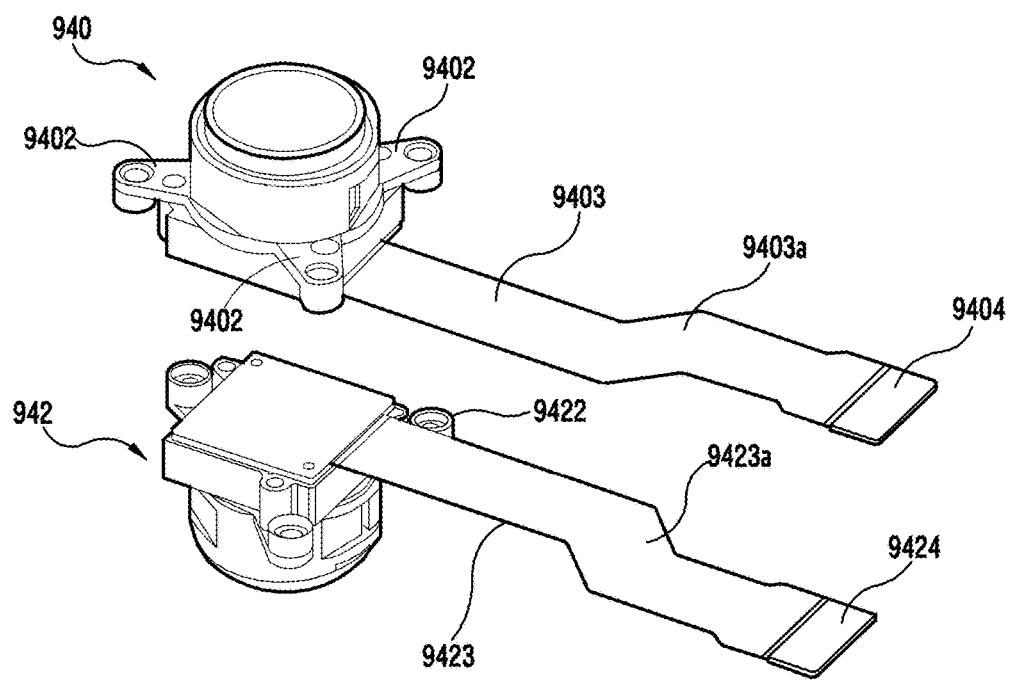
FIG. 9A is a view illustrating first and second camera modules in an expanded state according to an embodiment of the present disclosure.
Figure 9B:
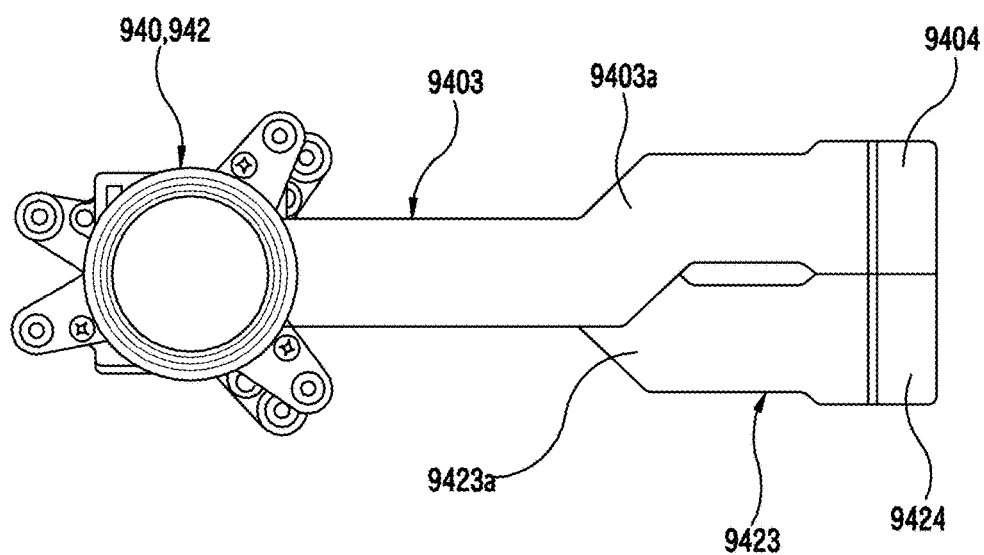
FIG. 9B is a view illustrating first and second camera modules in an expanded state according to another embodiment of the present disclosure.

FIGS. 9A and 9B are views illustrating first and second camera modules in an expanded state according to an embodiment of the present disclosure.

Referring to FIG. 9A, a first camera module 940 may be physically fastened inside a housing by a first support structure 9402. For example, the first support structure 9402 may include a first support in the shape of a tripod. The first camera module 940 may be electrically connected to a board by a first electric connection member 9403. For example, the first electric connection member 9403 may include a first flexible circuit. Hereinafter, the first electric connection member 9403 will be referred to as a first flexible circuit. The first flexible circuit 9403 includes a first slim connector 9404 at an end thereof, and may have a substantially S-like shape by a bent portion 9403a when the first flexible circuit 9403 is unrolled evenly.

A second camera module 942 may be physically fastened inside a housing by a second support structure 9422. For example, the second support structure 9422 may include a second support in the shape of a tripod. The second camera module 942 may be electrically connected to the board by a second electric connection member 9423. For example, the second electric connection member 9423 may include a second flexible circuit. Hereinafter, the second electric connection member 9423 will be referred to as a second flexible circuit. The second flexible circuit 9423 includes a second slim connector 9424 at an end thereof, and may have a substantially S-like shape by a bent portion 9423a when the second flexible circuit 9423 is unrolled evenly.

Referring to FIG. 9B, when the first and second camera modules 940 and 942 are arranged such that the first and second camera modules 940 and 942 are superimposed on each other, the first and second flexible circuits 9403 and 9423 may be arranged such that one of the first and second flexible circuits 9403 and 9423 are superimposed on another with the bent portions 9403a and 9423a being positioned to be symmetric to each other. According to an embodiment in an expanded state, when each of the first and second flexible circuits 9403 and 9423 are unrolled, the first and second slim connectors 9404 and 9424 may be arranged in parallel to each other because each of the first and second flexible circuit 9403 and 9423 is formed in the S shape.

Figure 10A:
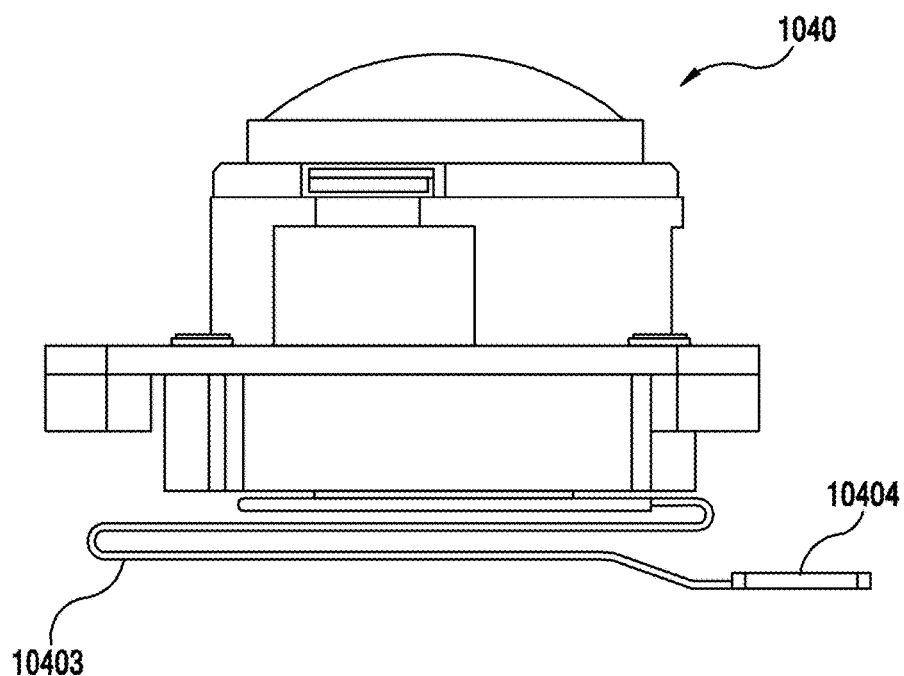
FIG. 10A is a view illustrating first and second camera modules in a mounted state according to an embodiment of the present disclosure.

Referring to FIG. 10A, a first flexible circuit 10403 of a first camera module 1040 may be bent substantially in an S shape such that a first slim connector 10404 may be connected to a first portion of a board.

Figure 10B:
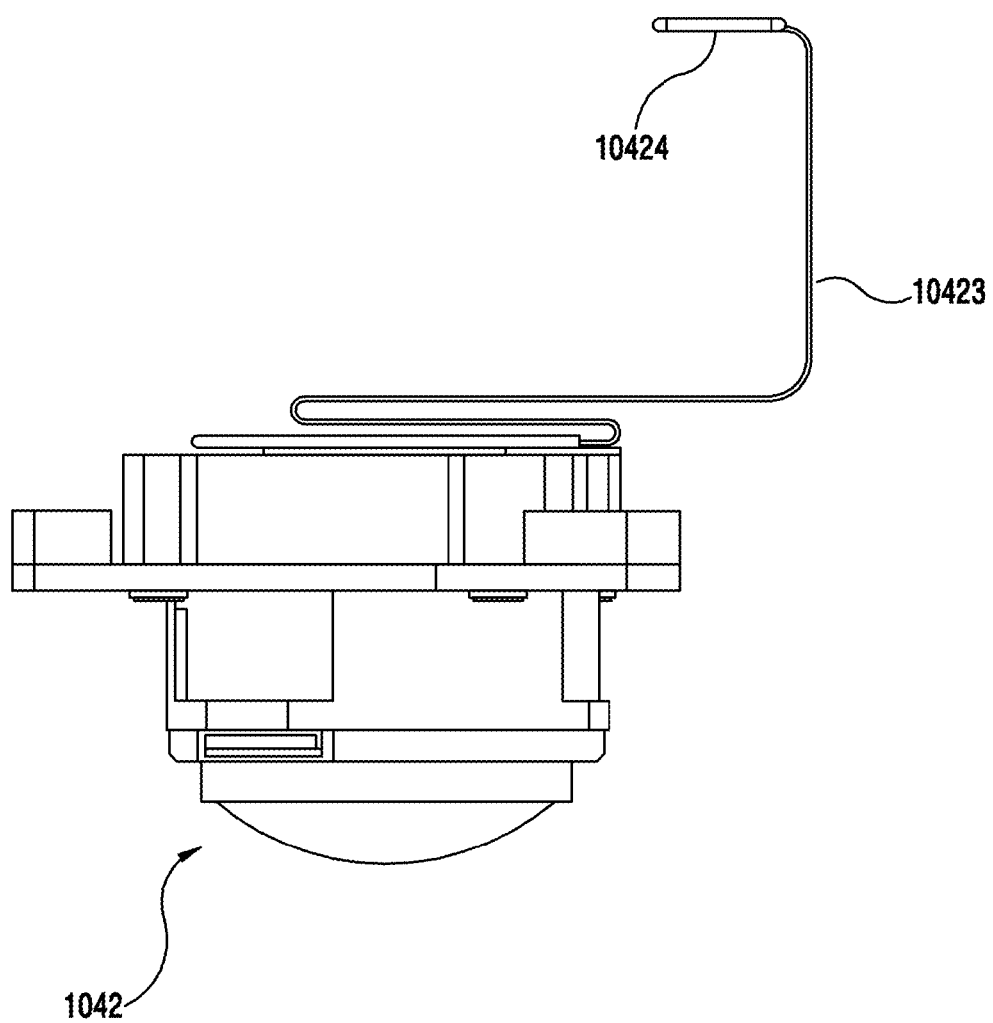
FIG. 10B is a view illustrating first and second camera modules in a mounted state according to another embodiment of the present disclosure.

Referring to FIG. 10B, a second flexible circuit 10423 of a second camera module 1042 may be bent substantially in an S shape such that a second slim connector 10424 may be connected to a second portion of a board.

Figure 11:
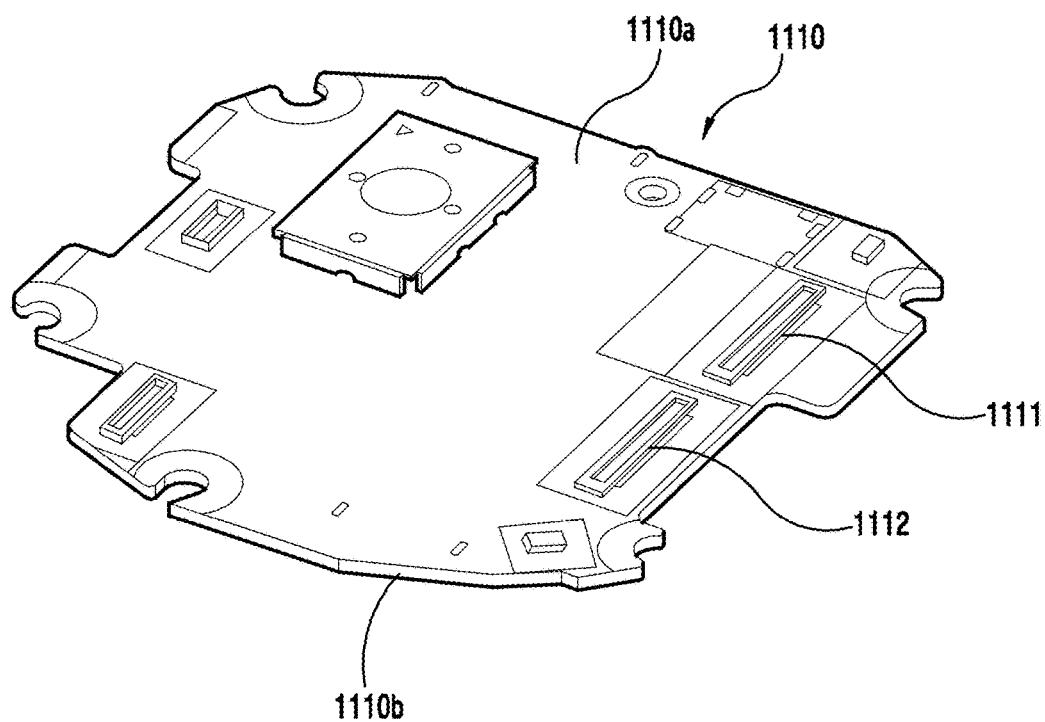
FIG. 11 is a perspective view illustrating a circuit board of an electronic device according to an embodiment of the present disclosure.

FIG. 11 is a perspective view illustrating a circuit board of an electronic device according to an embodiment of the present disclosure.

Referring to FIG. 11, a board 1110 according to an embodiment of the present disclosure includes first and second connection connectors 1111 and 1112 that may be disposed on a first face 1110a thereof so as to be electrically connected to first and second flexible circuits of first and second camera modules. The first and second connection connectors 1111 and 1112 may be respectively connected with first and second slim connectors on the same plane. The first and second connection connectors 1111 and 1112 may be arranged in parallel to each other.

According to an embodiment of the present disclosure, the first face of the board 1110a may connect the first and second camera modules, the first and second flexible circuits, a display, a WiFi antenna, and a WiFi/BT antenna. Further, a flexible circuit of a microphone and a key button may be connected.

According to an embodiment of the present disclosure, the second face of the board 1110b may connect an NFC antenna, and a speaker.

Figure 12:
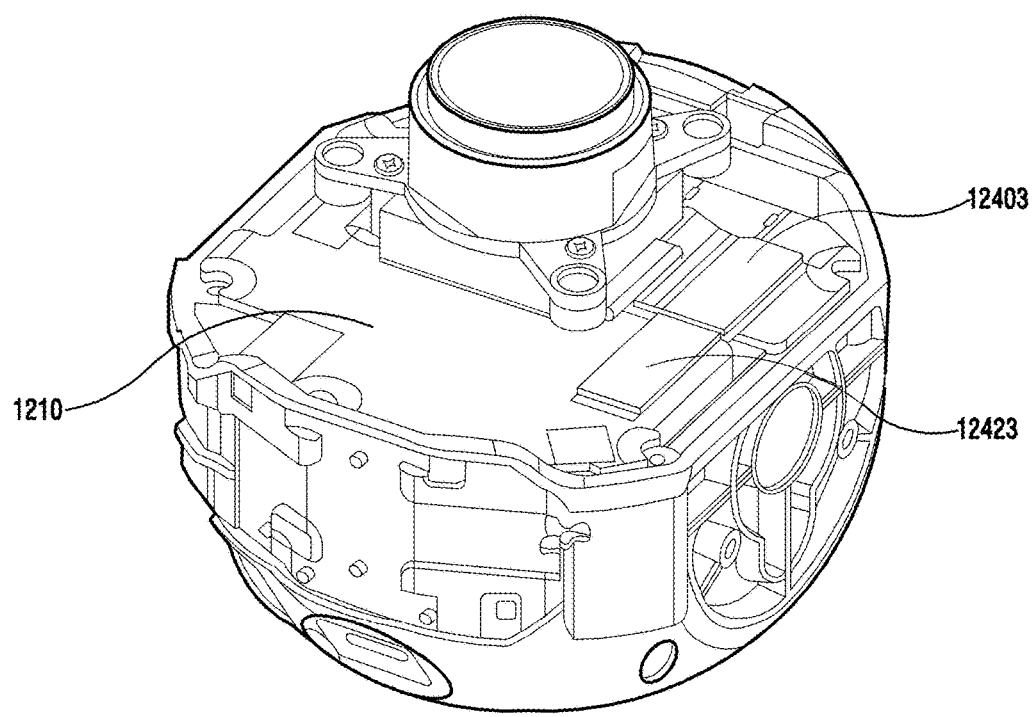
FIG. 12 is a perspective view illustrating a state in which first and second camera modules are mounted according to an embodiment of the present disclosure.

FIG. 12 illustrates a state in which each of first and second flexible circuits 12403 and 12423 according to an embodiment of the present disclosure is connected to the first face of a board 1210.

Figure 13:
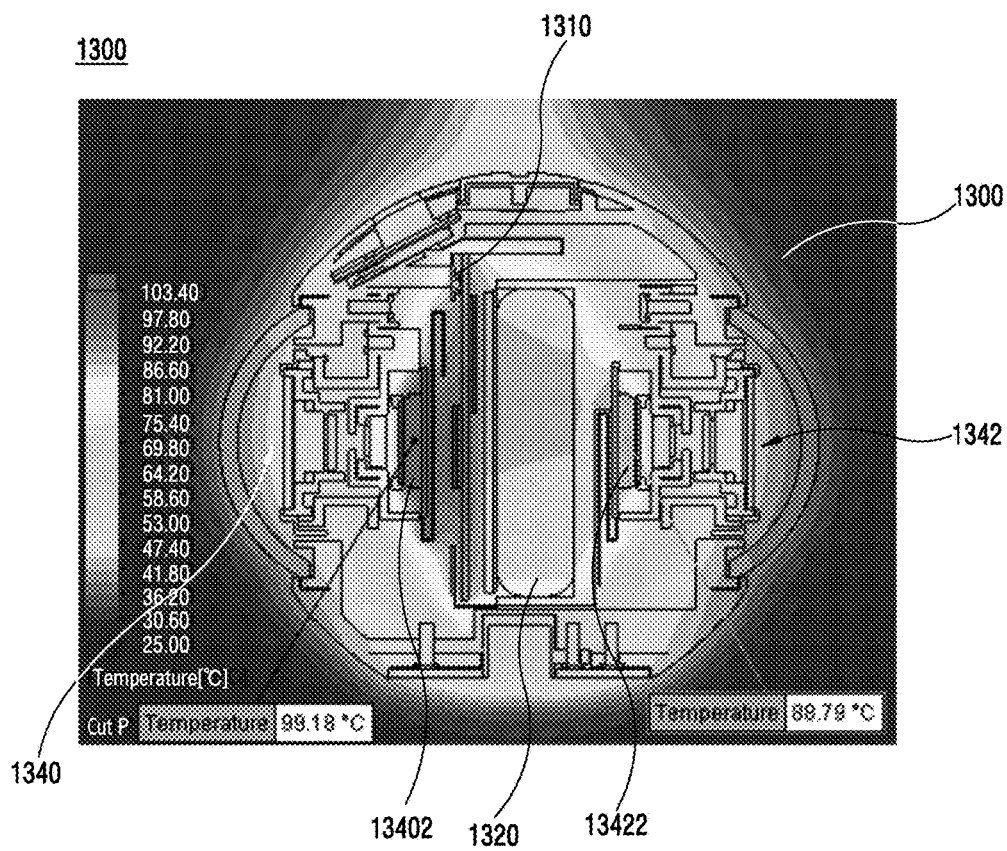
FIG. 13 is a view illustrating a temperature distribution state according to heat generation of an electronic device according to an embodiment of the present disclosure.

FIG. 13 is a view illustrating, using colors, a temperature distribution state according to heat generation of an electronic device 1300 according to an embodiment of the present disclosure.

Referring to FIG. 13, the electronic device 1300 may be the same as the electronic device 400 illustrated in FIGS. 4A and 4B. In the electronic device 1300, a board 1310 may be disposed adjacent to a first camera module 1340 in order to secure a battery capacity. Due to such an arrangement, a temperature difference occurs between first and second image sensors 13402 and 13422, which may cause a difference in image quality between left and right images.

When the electronic device 1300 is operated, heat may be generated from the board 1310 and the battery 1320. For example, in the board 1310, an application processor (AP) or a central processor (CP) may be a heat generating source, and in the battery 1320, a battery cell may be a heat generating source.

The heat generating temperature of the battery 1320 and the heat generating temperature of the board 1310 are different from each other, a temperature difference occurs between the first and second image sensors 13402 and 13422, which may cause a difference in image quality between the first and second camera modules 1340 and 1342. Accordingly, it is necessary to maintain a thermal equilibrium between the first and second image sensors 13402 and 13422.

A heat circulation structure for thermal equilibrium between the first and second image sensors will be described with reference to FIGS. 14A and 14B.

Figure 14A:
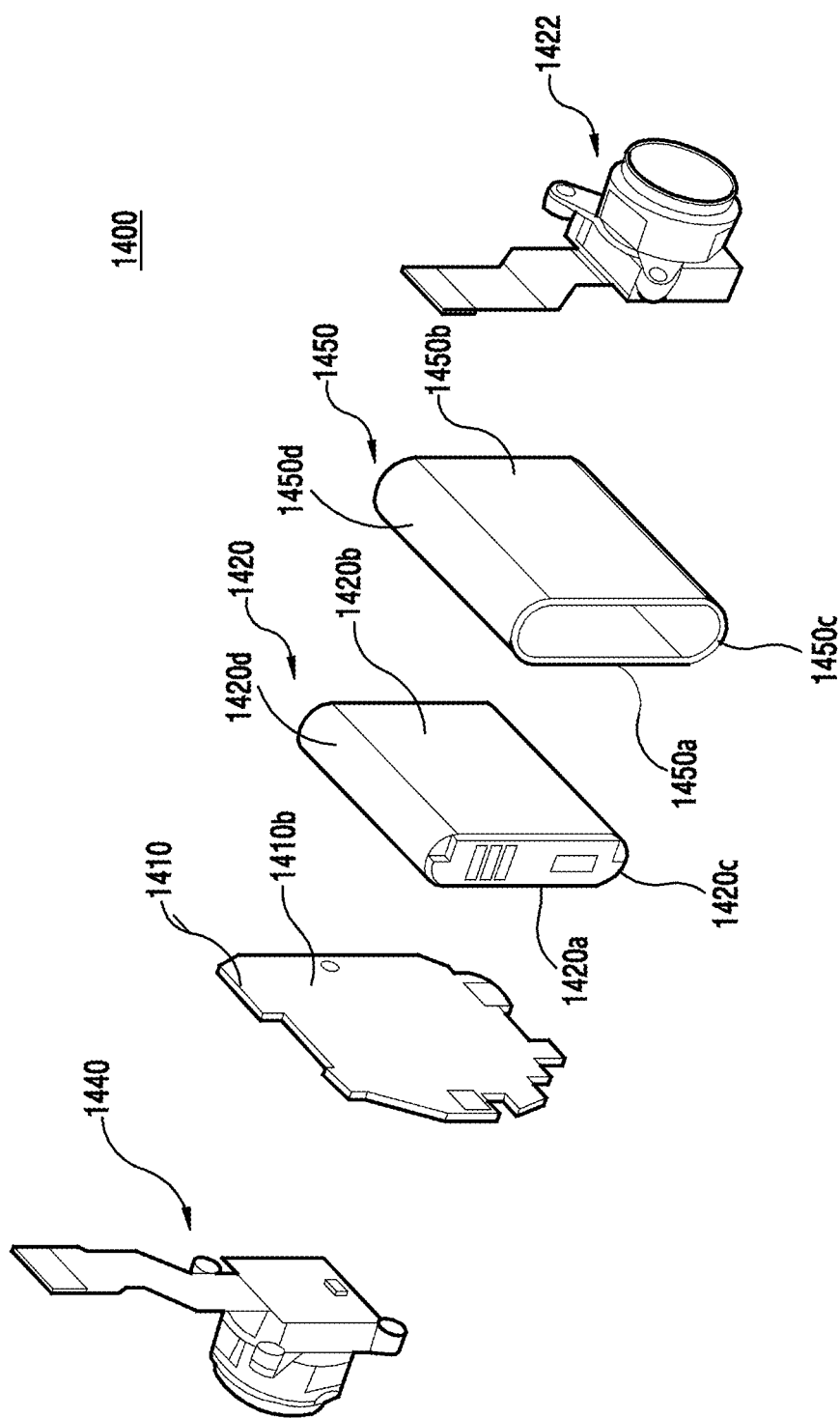
FIG. 14A is a perspective view illustrating an arrangement state of internal components of an electronic device including a thermal equilibrium circulation member according to an embodiment of the present disclosure.

FIG. 14A is a perspective view illustrating an arrangement of internal components of an electronic device including a thermal equilibrium circulation member according to an embodiment of the present disclosure. FIG. 14B is an illustrative view illustrating an arrangement of internal components of an electronic device including a thermal equilibrium circulation member according to an embodiment of the present disclosure.

Figure 14B:
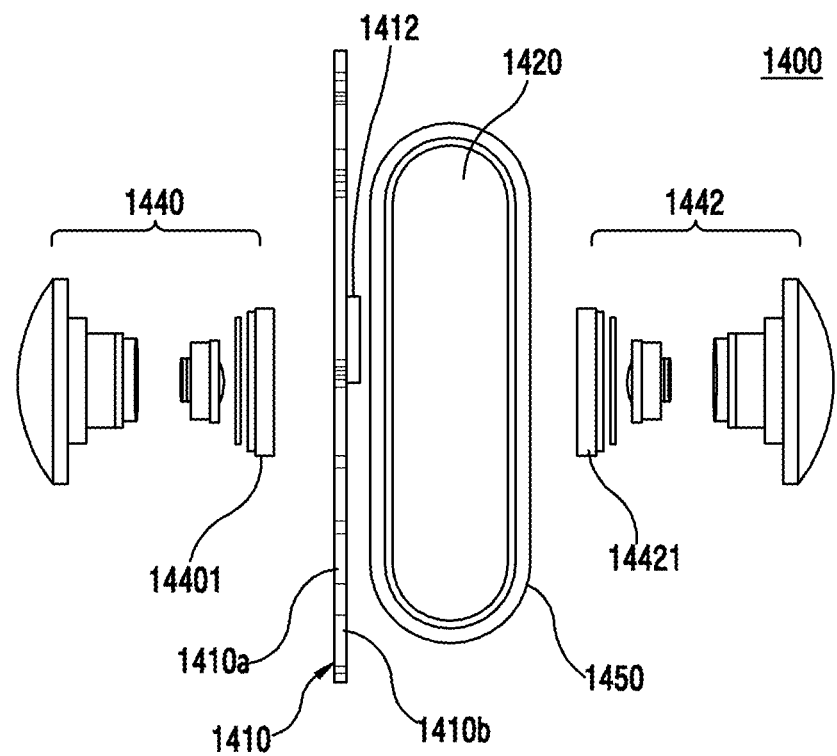
FIG. 14B is a view illustrating an arrangement of internal components of an electronic device including a thermal equilibrium circulation member according to an embodiment of the present disclosure.

Referring to FIGS. 14A and 14B, the electronic device 1400 may be the same as the electronic device 400 illustrated in FIGS. 4A and 4B. The electronic device 1400 includes a thermal equilibrium circulation member 1450 for creating thermal equilibrium between first and second image sensors 14401 and 14421, which are mounted on first and second camera modules 1440 and 1442, respectively.

The thermal equilibrium circulation member 1450 may include a metallic material having excellent heat conductivity (e.g., copper).

The thermal equilibrium circulation member 1450 may be provided on a battery 1420 such that the heat transferred from a heat generating source 1412 mounted on a board 1410 may be guided to flow to the second camera module 1442. The temperature difference between the first and second image sensors 14401 and 14421 may be minimized by the thermal equilibrium circulation member 1450.

According to an embodiment of the present disclosure, the thermal equilibrium circulation member 1450 may surround the battery 1420. For example, the battery 1420 includes a first face 1420a that faces the heat generating source 1412 of the board, a second face 1420b that faces the second image sensor 14421, and third and fourth faces 1420c and 1420d that interconnect the first and second faces 1420a and 1420b. The thermal equilibrium circulation member 1450 may be configured in a shape that surrounds the first and second faces 1420a and 1420b and surrounds and connects the third and fourth faces 1420c and 1420d for heat circulation. For example, the thermal equilibrium circulation member 1450 may have a closed curve shape in a cross section. The thermal equilibrium circulation member 1450 includes first to fourth portions 1450a to 1450d that wrap the first to fourth faces 1420a to 1420d of the battery. The first portion 1450a of the thermal equilibrium circulation member may be disposed between the heat generating source 1412 and the first face 1420a of the battery, and the second portion 1450b may be disposed between the second face 1420b of the battery and the second image sensor 14421.

According to an embodiment of the present disclosure, when a high temperature is generated from a heat generating source 1412 (e.g., an AP or a CP), the generated heat may be transferred to the first portion 1450a of the thermal equilibrium circulation member, and the transferred heat may be transferred to the second portion 1450b via the third and fourth portions 1450c and 1450d, thereby being radiated to the second image sensor 14421. The heat may flow from a relatively high temperature portion to a relatively low temperature portion, and the first and second image sensors 14401 and 14421 may substantially reach a thermal equilibrium by such a heat flow.

According to an embodiment of the present disclosure, the thermal equilibrium circulation member 1450 may be configured in various types. For example, the thermal equilibrium circulation member 1450 may be arranged in an insertion type on the battery 1420, or may be attached to the outer surface of the battery 1420 in a bonding type using a tape. Further, the thermal equilibrium circulation member 1450 may be configured as a one piece structure, but may also be configured by dividing the thermal equilibrium circulation member 1450 into a plurality of sections and combining the sections.

Figure 15:
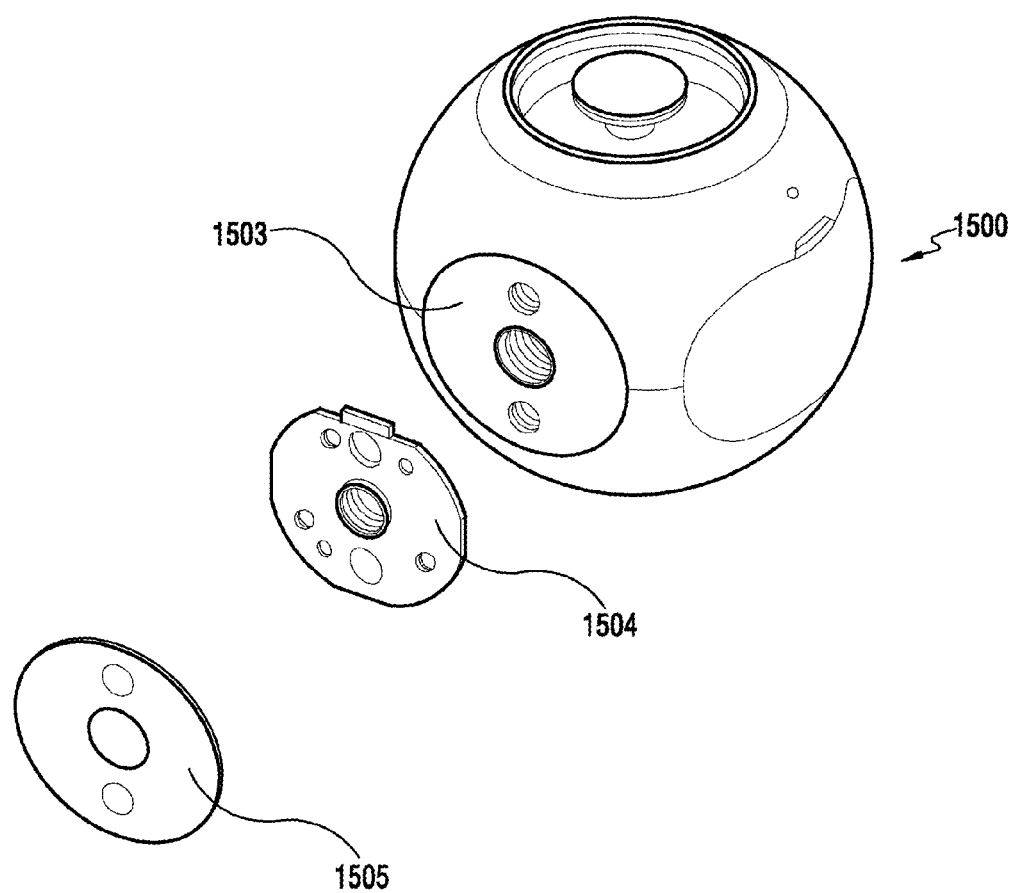
FIG. 15 is a perspective view illustrating a configuration of a mounting part of an electronic device according to an embodiment of the present disclosure.

FIG. 15 is a perspective view illustrating a configuration of a mounting part of an electronic device according to an embodiment of the present disclosure.

Referring to FIG. 15, the electronic device 1500 may be the same as the electronic device 400 illustrated in FIGS. 4A and 4B. The electronic device 1500 includes a flat mounting part 1503 on the bottom portion below an optical axis. The mounting part 1503 may serve as a rotation stopper for the electronic device 1500, and may be a portion to be mounted on other devices. The electronic device 1500 may further include a metal mount 1504 and a rubber member 1505 such that the electronic device 1500 may be mounted on other devices. The other devices may be, for example, a camera accessory (e.g., a tripod, a selfie stick, an external battery, or various coupling mounts), an action camera, a smart phone, or an unmanned aerial vehicle.

According to an embodiment of the present disclosure, the electronic device 1500 may require a holder to be mounted on a smart phone, or may require a camera gimbal to be mounted on an unmanned air vehicle, such as a drone. In addition, an image photographed using the electronic device 1500 may be used in a virtual reality (VR) device.

Figure 16:
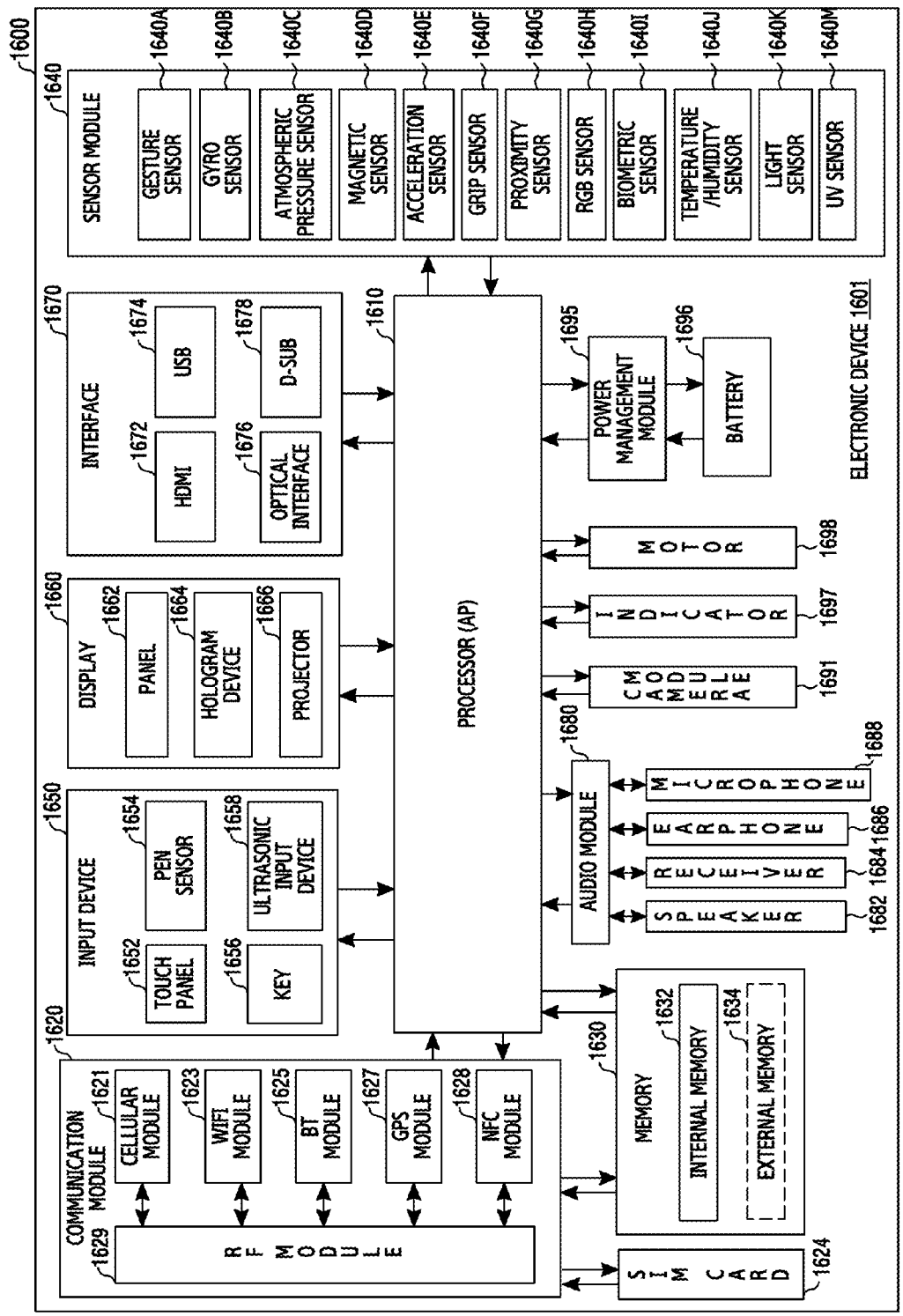
FIG. 16 is a block diagram illustrating a configuration of an electronic device according to an embodiment of the present disclosure.

FIG. 16 is a block diagram 1600 of an electronic device 1601 according to an embodiment of the present disclosure. The electronic device 1601 may be the same as the electronic device 400 illustrated in FIGS. 4A and 4B. For example, the electronic device 1601 may be an imaging device, such as an action camera, or a video image photographing device. In particular, the electronic device 1601 may be a high speed video image photographing device.

Referring to FIG. 16, the electronic device 1601 includes an application processor (AP) 1610, a communication module 1620, a subscriber identification module (SIM) card 1624, a memory 1630, a sensor module 1640, an input device 1650, a display 1660, an interface 1670, an audio module 1680, a camera module 1691, a power management module 1695, a battery 1696, an indicator 1697, and a motor 1698.

The AP 1610 runs an operating system or an application program to control a plurality of hardware or software constituent elements connected to the AP 1610, and may perform processing and operation of various data including multimedia data. The AP 1610 may be, for example, implemented as a system on chip (SoC). According to an embodiment of the present disclosure, the AP 1610 further includes a graphical processing unit (GPU). The AP 1610 further includes at least one other constituent elements (e.g., the cellular module 1621). The AP 1610 loads an instruction or data, which is received from a non-volatile memory connected to each or at least one of other constituent elements, to a volatile memory and processes the loaded instruction or data. In addition, the AP 1610 stores in the non-volatile memory, data received from at least one of the other constituent elements or generated by at least one of the other constituent elements.

The communication module 1620 performs data transmission/reception in communication between the electronic device 1601 and other electronic devices connected through a network. According to an embodiment of the present disclosure, the communication module 1620 includes cellular module 1621, a Wi-Fi module 1623, a BT module 1625, a GPS module 1627, an NFC module 1628, and a radio frequency (RF) module 1629.

The cellular module 1621 provides a voice telephony, a video telephony, a text service, an Internet service, and the like, through a telecommunication network such as long term evolution (LTE), fifth generation (5G), long term evolution advanced (LTE-A), code division multiple access (CDMA), wideband code division multiple access (WCDMA), universal mobile telecommunications system (UMTS), wireless broadband (WiBro), and global system for mobile communication (GSM). In addition, the cellular module 1621 may, for example, use a SIM card 1624 to perform electronic device authentication and authorization within the telecommunication network. According to an embodiment of the present disclosure, the cellular module 1621 may perform at least some of functions that the AP 1610 may provide. For example, the cellular module 1621 performs at least one part of a multimedia control function.

The WiFi module 1623, the BT module 1625, the GPS module 1627 and the NFC module 1628 each may include, for example, a processor for processing data transmitted/received through the corresponding module. According to an embodiment of the present disclosure, at least some (e.g., two or more) of the cellular module 1621, the WiFi module 1623, the BT module 1625, the GPS module 1627 and the NFC module 1628 are included within one IC or IC package.

The RF module 1629 performs transmission/reception of data, for example, transmission/reception of an RF signal. The RF module 1629 may include, for example, a transceiver, a power amplifier module (PAM), a frequency filter, a low noise amplifier (LNA), an antenna and the like. According to an embodiment of the present disclosure, at least one of the cellular module 1621, the WiFi module 1623, the BT module 1625, the GPS module 1627 or the NFC module 1628 may perform transmission/reception of an RF signal through a separate RF module.

The SIM card 1624 includes a SIM, and may be inserted into a slot provided in a specific position of the electronic device 1601. The SIM card 1624 includes unique identification information (e.g., an integrated circuit card ID (IC-CID)) or subscriber information (e.g., an international mobile subscriber identity (IMSI)).

The memory 1630 includes an internal memory 1632 or an external memory 1634. The internal memory 1632 includes, for example, at least one of a volatile memory (e.g., a dynamic random access memory (DRAM), a static RAM (SRAM) and a synchronous DRAM (SDRAM)) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, and a not or (NOR) flash memory).

According to an embodiment of the present disclosure, the internal memory 1632 may be a solid state drive (SSD). The external memory 1634 may further include a flash drive, for example, compact flash (CF), secure digital (SD), micro-SD, mini-SD, extreme digital (xD), a memory stick, and the like. The external memory 1634 may be operatively connected with the electronic device 1601 through various interfaces.

The sensor module 1640 measures a physical quantity or detects an activation state of the electronic device 1601, and converts measured or detected information into an electric signal. The sensor module 1640 includes, for example, at least one of a gesture sensor 1640A, a gyro sensor 1640B, an air pressure sensor 1640C, a magnetic sensor 1640D, an acceleration sensor 1640E, a grip sensor 1640F, a proximity sensor 1640G, a color sensor 1640H (e.g., a red, green, blue (RGB) sensor), a bio-physical sensor 1640I, a temperature/humidity sensor 1640J, an illumination sensor 1640K, a ultraviolet (UV) sensor 1640M, and the like. Additionally or alternatively, the sensor module 1640 may also include, for example, an E-nose sensor, an electromyography (EMG) sensor, an electroencephalogram (EEG) sensor, an electrocardiogram (ECG) sensor, an infrared (IR) sensor, an iris sensor, a fingerprint sensor, and the like. The sensor module 1640 may further include a control circuit for controlling at least one or more sensors belonging therein.

The input device 1650 includes a touch panel 1652, a (digital) pen sensor 1654, a key 1656, an ultrasonic input device 1658, and the like. The touch panel 1652 may, for example, detect a touch input in at least one of a capacitive overlay scheme, a pressure sensitive scheme, an infrared beam scheme, and an acoustic wave scheme. The touch panel 1652 may also include a control circuit. In a case of the capacitive overlay scheme, physical contact or proximity detection is possible. The touch panel 1652 may further include a tactile layer, to provide a tactile response to a user.

The (digital) pen sensor 1654 may be implemented in the same or similar method to receiving a user's touch input or by using a separate sheet for detection. The key 1656 may include, for example, a physical button, an optical key, or a keypad. The ultrasonic input device 1658 is capable of identifying data by detecting a sound wave in the electronic device 1601 through an input tool generating an ultrasonic signal, and enables wireless detection. According to an embodiment of the present disclosure, the electronic device 1601 may also use the communication module 1620 to receive a user input from a connected external device (e.g., a computer or a server).

The display 1660 includes a panel 1662, a hologram device 1664, or a projector 1666. The panel 1662 may be, for example, an LCD, an active-matrix organic LED (AMO-LED), and the like. The panel 1662 may be, for example, implemented to be flexible, transparent, or wearable. The panel 1662 may be constructed as one module along with the touch panel 1652 as well. The hologram device 1664 may use interference of light to show a three-dimensional image in the air. The projector 1666 may project light to a screen to display an image. The screen may be, for example, located inside or outside the electronic device 1601. According to an embodiment of the present disclosure, the display 1660 may further include a control circuit for controlling the panel 1662, the hologram device 1664, or the projector 1666.

The interface 1670 includes, for example, a high-definition multimedia interface (HDMI) 1672, a universal service bus (USB) 1674, an optical interface 1676, or a D-subminiature (D-sub) 1678. Additionally or alternatively, the interface 1670 includes, for example, a mobile high-definition link (MHL) interface, an SD card/multimedia card (MMC) interface or an infrared data association (IrDA) standard interface.

The audio module 1680 converts a voice and an electric signal bidirectionally. The audio module 1680 may, for example, process sound information which is inputted or outputted through a speaker 1682, a receiver 1684, an earphone 1686, a microphone 1688, and the like.

The camera module 1691 takes still pictures and moving pictures. According to an embodiment of the present disclosure, the camera module 1691 includes one or more image sensors (e.g., a front sensor or a rear sensor), a lens, an image signal processor (ISP), or a flash (e.g., an LED or a xenon lamp).

The power management module 1695 manages electric power of the electronic device 1601. The power management module 1695 includes, for example, a power management integrated circuit (PMIC), a charger IC, a battery, a battery gauge, and the like.

The PMIC may be, for example, mounted within an integrated circuit or an SoC semiconductor. A charging scheme may be divided into a wired charging scheme and a wireless charging scheme. The charger IC charges the battery 1696, and prevents the overvoltage or overcurrent from an electric charger. According to an embodiment of the present disclosure, the charger IC includes a charger IC for at least one of the wired charging scheme or the wireless charging scheme. The wireless charging scheme may, for example, be a magnetic resonance scheme, a magnetic induction scheme, an electromagnetic wave scheme, and the like. A supplementary circuit for wireless charging, for example, a circuit, such as a coil loop, a resonance circuit, a rectifier, and the like, may be added.

The battery gauge may, for example, measure a charge level of the battery 1696, a voltage during charging, a current or a temperature. The battery 1696 generates or stores electricity, and uses the stored or generated electricity to supply power to the electronic device 1601. The battery 1696 may include, for example, a rechargeable battery or a solar battery.

The indicator 1697 displays a specific status of the electronic device 1601 or one part (e.g., the AP 1610) thereof, for example a booting state, a message state, a charging state, and the like. The motor 1698 may convert an electric signal into a mechanical vibration. The electronic device 1601 may include a processing device (e.g., a GPU) for mobile TV support. The processing device for mobile TV support may, for example, process media data according to the standards of digital multimedia broadcasting (DMB), digital video broadcasting (DVB), a media flow, and the like.

Each of the above-described elements of the electronic device may include one or more components, and the name of a corresponding element may vary according to the type of electronic device. The electronic device according to an embodiment of the present disclosure may include at least one of the above-described elements and may exclude some of the elements or further include other additional elements. Further, some of the elements of the electronic device may be coupled to form a single entity while performing the same functions as those of the corresponding elements before the coupling.

The term "module," as used herein may represent, for example, a unit including a combination of one or two or more of hardware, software, or firmware. The term "module" may be, for example, used interchangeably with the terms "unit", "logic", "logical block", "component", or "circuit" etc. The "module" may be the minimum unit of an integrally constructed component or a part thereof. The "module" may be also the minimum unit performing one or more functions or a part thereof. The "module" may be implemented mechanically or electronically. For example, the "module" may include at least one of an application-specific integrated circuit (ASIC) chip, field programmable gate arrays (FPGAs) and a programmable-logic device performing some operations known to the art or to be developed in the future.

At least a part of an apparatus (e.g., modules or functions thereof) or method (e.g., operations) according to an embodiment of the present disclosure may be, for example, implemented as instructions stored in a computer-readable storage medium in a form of a programming module. In the case that the instruction is executed by a processor, and the processor may perform functions corresponding to the instructions. The computer-readable storage media may be the memory 130, for instance.

The computer-readable recording medium may include a hard disk, a floppy disk, and a magnetic medium (e.g., a magnetic tape), an optical medium (e.g., a compact disc—read only memory (CD-ROM) and a Digital Versatile Disc (DVD)), a magneto-optical medium (e.g., a floptical disk), and a hardware device (e.g., a read only memory (ROM), a random access memory (RAM), a flash memory, etc.). Also, the program instruction may include not only code made by a compiler but also a high-level language code executable by a computer using an interpreter, etc. The aforementioned hardware device may be constructed to operate as one or more software modules in order to perform operations of the present disclosure, and vice versa.

The module or programming module according to an embodiment of the present disclosure may include at least one or more of the aforementioned constituent elements, or omit some of the aforementioned constituent elements, or further include additional other constituent elements. Operations carried out by the module, the programming module or the other constituent elements may be executed in a sequential, parallel, repeated or heuristic method. Also, some operations may be executed in different order or may be omitted, or other operations may be added.

While the present disclosure has been shown and described with reference to certain embodiments thereof, it will be apparent to those skilled in the art that the camera lens module according to the present disclosure is not limited to these embodiments, and various changes in form and details may be made therein without departing from the spirit and scope of the present disclosure as defined by the appended claims and their equivalents.

What is claimed is:

1. An electronic device comprising:
a housing having a sphere shape;
a battery included in the housing;
a first camera module disposed on a first portion of the housing to face in a first direction, and having a first lens cover protruding in a convex shape from an outer surface of the housing; and
a second camera module disposed on a second portion of the housing, which is positioned to be opposite to the first portion of the housing, to face in a second direction that is opposite to the first direction, and having a second lens cover protruding in a convex shape from an outer surface of the housing,
wherein the battery is disposed to be substantially upright with respect to an optical axis of the first camera module and the second camera module at a substantial center of the housing,
wherein the first camera module includes a first lens system configured to face the first lens cover and a first image sensor configured to face the first lens system,
wherein the second camera module includes a second lens system configured to face opposite to the first lens system and face the second lens cover, and a second image sensor configured to face opposite to the first image sensor and face the second lens system,
wherein the electronic device includes the battery and a printed circuit board, each of which is interposed between the first image sensor and the second image sensor such that a first surface of the battery faces the first image sensor and a second surface of the printed circuit board faces the second image sensor, and
wherein the first camera module is connected to a first portion of the second surface of the printed circuit board by a first flexible circuit, and the second camera module is connected to a second portion of the second surface, which is parallel to the first portion of the second surface of the printed circuit board by a second flexible circuit.

2. The electronic device of claim 1, wherein the housing has a directionality of rotation when the housing rolls with an aid of the first and second lens covers and the battery.

3. The electronic device of claim 2, wherein the housing rotates substantially around the optical axis of the first and second camera module.

4. The electronic device of claim 1, wherein the outer surface of the housing has a first curvature, each of the first lens cover and the second lens cover has a second curvature, and the first curvature is larger than the second curvature.

5. The electronic device of claim 1, wherein the housing is configured in a shape that is disposed within first and second blind areas that do not interfere with first and second angles of view of each of the first camera module and the second camera module.

6. The electronic device of claim 5, wherein each of the first and second angles of view is larger than 180 degrees such that 360-degree image photographing is enabled.

7. The electronic device of claim 1, wherein the battery is interposed between the first image sensor and the printed circuit board to face each of the first image sensor and the printed circuit board, or interposed between the second image sensor and the printed circuit board such that a third surface opposite to the first surface of the battery faces to a fourth surface opposite to the second surface of the printed circuit board.

8. The electronic device of claim 1, wherein the first lens system and the second lens system include first and second fish-eye lenses, respectively, and the first and second fish-eye lenses are disposed to face the first and second lens covers, respectively.

9. The electronic device of claim 1, wherein each of the first lens system and the second lens system, each of the first image sensor and the second image sensor, the battery, the printed circuit board, and the first lens cover and the second lens cover are disposed along the optical axis to be spaced apart from each other and to face each other.

10. The electronic device of claim 1, wherein the battery further includes a thermal equilibrium circulation member so as to minimize a temperature difference between the first image sensor and the second image sensor.

11. The electronic device of claim 10, wherein, if the battery is disposed to face the second image sensor and the printed circuit board is disposed to face the first image sensor, at least a portion of the thermal equilibrium circulation member receives heat generated from a heat generating source disposed on the printed circuit board and transfers the heat to an area in which the second image sensor is disposed.

12. The electronic device of claim 11, wherein a cross section of the thermal equilibrium circulation member has a closed curve shape, and is configured to surround at least a portion of a face of the battery, which the thermal equilibrium circulation member faces.

13. The electronic device of claim 1, wherein the first flexible circuit has substantially an S shape when it is unfolded, and is connected to the first portion by being bent substantially in an S shape, and the second flexible circuit has substantially an S shape when it is unfolded, and is connected to the second portion by being bent substantially in an S shape.

14. The electronic device of claim 1, wherein the housing further includes a flat mounting part that is positioned below the optical axis to be parallel to the optical axis, the mounting part being configured to serve as a rotation stopper and to be coupled with another device.

15. The electronic device of claim 14, wherein the mounting part further includes a metal bracket which contributes to a center of gravity of the housing.

16. An electronic device comprising:
a housing having a sphere shape;
a battery included in the housing;
a first lens cover disposed on a first portion of the housing to face in a first direction, and protruding in a convex shape from an external face of the housing;
a second lens cover disposed on a second portion of the housing, which is opposite to the first portion of the housing, to face in a second direction that is opposite to the first direction, and protruding in a convex shape from an external face of the housing;
a first lens configured to face the first lens cover and having a first angle of view; and
a second lens positioned to be opposite to the first lens, and configured to face the second lens cover, the second lens having a second angle of view,
wherein the housing is configured in a shape that is disposed within first and second blind areas that do not interfere with first and second angles of view, respectively,
wherein the battery is disposed to be substantially upright with respect to an optical axis of the first lens and the second lens at a substantial center of the housing,
wherein a first camera module includes the first lens configured to face the first lens cover and a first image sensor configured to face the first lens,
wherein a second camera module includes the second lens configured to face opposite the first lens and face the second lens cover, and a second image sensor configured to face opposite to the first image sensor and face the second lens,
wherein the electronic device includes the battery and a printed circuit board, each of which is interposed between the first image sensor and the second image sensor such that a first surface of the battery faces the first image sensor and a second surface of the printed circuit board faces the second image sensor, and
wherein the first camera module is connected to a first portion of the second surface of the printed circuit board by a first flexible circuit, and the second camera module is connected to a second portion of the second surface, which is parallel to the first portion of the second surface of the printed circuit board by a second flexible circuit.

17. The electronic device of claim 16, wherein each of the first and second angles of view is larger than 180 degrees such that 360-degree image photographing is enabled.

* * * * *